(12) United States Patent  
Kwak et al.

(10) Patent No.: US 12,432,758 B2
(45) Date of Patent: Sep. 30, 2025

(54) FREQUENCY RESOURCE ALLOCATION FOR REDUCED CAPABILITY DEVICES

(71) Applicant: QUALCOMM Incorporated, San Diego, CA (US)

(72) Inventors: Yongjun Kwak, San Diego, CA (US); Muhammad Nazmul Islam, Littleton, MA (US); Prashant Sharma, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 748 days.

(21) Appl. No.: 17/732,269

(22) Filed: Apr. 28, 2022

(65) Prior Publication Data

US 2023/0354390 A1 Nov. 2, 2023

(51) Int. Cl.
*H04W 72/51* (2023.01)
*H04L 5/00* (2006.01)
*H04W 72/0453* (2023.01)

(52) U.S. Cl.
CPC ........... *H04W 72/51* (2023.01); *H04L 5/0012* (2013.01); *H04L 5/0092* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2021/0014709 | A1* | 1/2021 | Devarasetty | H04W 72/542 |
| 2021/0105756 | A1* | 4/2021 | Shen | H04W 72/0453 |
| 2021/0250156 | A1* | 8/2021 | Kim | H04W 76/27 |
| 2022/0053462 | A1* | 2/2022 | Wang | H04W 72/044 |
| 2022/0368498 | A1* | 11/2022 | Sun | H04L 5/0094 |
| 2023/0070254 | A1* | 3/2023 | Ma | H04L 5/0094 |
| 2023/0209563 | A1* | 6/2023 | Huang | H04W 72/23 370/329 |
| 2023/0261828 | A1* | 8/2023 | Ji | H04B 17/104 370/329 |
| 2023/0396972 | A1* | 12/2023 | Prabhakar | H04W 4/50 |
| 2024/0064739 | A1* | 2/2024 | Falkenberg | H04W 72/40 |
| 2024/0172235 | A1* | 5/2024 | Pan | H04W 72/02 |
| 2024/0259173 | A1* | 8/2024 | Kim | H04L 5/001 |
| 2025/0024359 | A1* | 1/2025 | Akman | H04L 12/4633 |

* cited by examiner

*Primary Examiner* — Phirin Sam
(74) *Attorney, Agent, or Firm* — Holland & Hart LLP

(57) ABSTRACT

Methods, systems, and devices for wireless communications are described. A user equipment (UE) may transmit an indication of a capability of the UE to support a restricted bandwidth for data signaling. The UE may receive an indication of a bandwidth part for control signaling and an indication of a set of frequency domain resources for the data signaling. The set of frequency domain resources may correspond to a subset of the bandwidth part in accordance with the restricted bandwidth. The UE may communicate the control signaling over the bandwidth part and data signaling over the set of frequency domain resources. In some cases, the bandwidth restriction may correspond to a bandwidth size for the set of frequency domain resources or a number of resource blocks in the set of frequency domain resources.

30 Claims, 18 Drawing Sheets

FREQUENCY RESOURCE ALLOCATION FOR REDUCED CAPABILITY DEVICES

FIELD OF TECHNOLOGY

The following relates to wireless communications, including frequency resource allocation for reduced capability devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support frequency resource allocation for reduced capability devices. For example, the described techniques provide for allocating a data bandwidth to a user equipment (UE) in accordance with a restricted bandwidth for data signaling. For example, the UE may be a reduced capability UE, and frequency domain resources for data channels for the reduced capability UE may be restricted to a certain bandwidth size or number of physical resource blocks (PRBs).

A method for wireless communications at a UE is described. The method may include transmitting an indication of a capability of the UE to support a restricted bandwidth for data signaling, receiving an indication of a bandwidth part (BWP) for control signaling and an indication of a set of frequency domain resources for the data signaling, where the set of frequency domain resources corresponds to a subset of the BWP in accordance with the restricted bandwidth, and communicating the control signaling over the BWP and data signaling over the set of frequency domain resources.

An apparatus for wireless communications at a UE is described. The apparatus may include a processor, memory coupled with the processor, and instructions stored in the memory. The instructions may be executable by the processor to cause the apparatus to transmit an indication of a capability of the UE to support a restricted bandwidth for data signaling, receive an indication of a BWP for control signaling and an indication of a set of frequency domain resources for the data signaling, where the set of frequency domain resources corresponds to a subset of the BWP in accordance with the restricted bandwidth, and communicate the control signaling over the BWP and data signaling over the set of frequency domain resources.

Another apparatus for wireless communications at a UE is described. The apparatus may include means for transmitting an indication of a capability of the UE to support a restricted bandwidth for data signaling, means for receiving an indication of a BWP for control signaling and an indication of a set of frequency domain resources for the data signaling, where the set of frequency domain resources corresponds to a subset of the BWP in accordance with the restricted bandwidth, and means for communicating the control signaling over the BWP and data signaling over the set of frequency domain resources.

A non-transitory computer-readable medium storing code for wireless communications at a UE is described. The code may include instructions executable by a processor to transmit an indication of a capability of the UE to support a restricted bandwidth for data signaling, receive an indication of a BWP for control signaling and an indication of a set of frequency domain resources for the data signaling, where the set of frequency domain resources corresponds to a subset of the BWP in accordance with the restricted bandwidth, and communicate the control signaling over the BWP and data signaling over the set of frequency domain resources.

In some examples of the method, apparatuses, and non-transitory computer-readable medium described herein, receiving the indication of the set of frequency domain resources may include operations, features, means, or instructions for receiving an indication of a first physical resource block of a set of consecutive physical resource blocks in the set of frequency domain resources.

In some examples of the method, apparatuses, and non-transitory computer-readable medium described herein, receiving the indication of the set of frequency domain resources may include operations, features, means, or instructions for receiving an indication of a position from a set of candidate positions for the set of frequency domain resources within the BWP.

In some examples of the method, apparatuses, and non-transitory computer-readable medium described herein, receiving the indication of the set of frequency domain resources may include operations, features, means, or instructions for receiving an indication of a set of one or more resource block groups for the set of frequency domain resources.

In some examples of the method, apparatuses, and non-transitory computer-readable medium described herein, receiving the indication of the set of frequency domain resources may include operations, features, means, or instructions for receiving an indication of a first physical resource block of the set of frequency domain resources within the BWP and a quantity of physical resource blocks for the set of frequency domain resources.

In some examples of the method, apparatuses, and non-transitory computer-readable medium described herein, receiving the indication of the set of frequency domain resources may include operations, features, means, or instructions for receiving an indication of one or more frequency hopping configurations for the set of frequency domain resources.

In some examples of the method, apparatuses, and non-transitory computer-readable medium described herein, each frequency hopping configuration of the one or more frequency hopping configurations includes a set of multiple frequency offsets corresponding to a set of multiple hops, and the set of multiple frequency offsets may be defined according to a reference point in the BWP.

In some examples of the method, apparatuses, and non-transitory computer-readable medium described herein, the set of frequency domain resources spans an entirety of the BWP or a portion of the BWP over a set of multiple hops in accordance with the one or more frequency hopping configurations.

In some examples of the method, apparatuses, and non-transitory computer-readable medium described herein, each frequency hopping configuration of the one or more frequency hopping configurations includes a switching time between a first hop of the set of frequency domain resources and a second hop of the set of frequency domain resources.

Some examples of the method, apparatuses, and non-transitory computer-readable medium described herein may further include operations, features, means, or instructions for receiving an indication of a frequency hopping configuration from the one or more frequency hopping configurations, where communicating the data signaling may be in accordance with the frequency hopping configuration based on the indication of the frequency hopping configuration.

In some examples of the method, apparatuses, and non-transitory computer-readable medium described herein, receiving the indication of the BWP may include operations, features, means, or instructions for receiving a first configuration for the BWP as a first BWP for the control signaling, where receiving the indication of the set of frequency domain resources includes receiving a second configuration for the set of frequency domain resources as a second BWP for the data signaling in accordance with the restricted bandwidth.

In some examples of the method, apparatuses, and non-transitory computer-readable medium described herein, the second configuration includes a frequency domain resource assignment indicator which indicates the second BWP.

In some examples of the method, apparatuses, and non-transitory computer-readable medium described herein, the second configuration indicates a BWP index out of a set of multiple BWP indexes for the second BWP.

In some examples of the method, apparatuses, and non-transitory computer-readable medium described herein, transmitting the indication of the capability may include operations, features, means, or instructions for transmitting the indication of the capability via a random access preamble message or a radio resource control message, or both.

Some examples of the method, apparatuses, and non-transitory computer-readable medium described herein may further include operations, features, means, or instructions for receiving one or more message of a random access procedure on the BWP or the set of frequency domain resources, or both, based on transmitting the indication of the capability.

Some examples of the method, apparatuses, and non-transitory computer-readable medium described herein may further include operations, features, means, or instructions for communicating includes monitoring for the control signaling on a downlink control channel on the BWP and data signaling on a downlink shared channel on the set of frequency domain resources.

Some examples of the method, apparatuses, and non-transitory computer-readable medium described herein may further include operations, features, means, or instructions for communicating includes transmitting the control signaling on an uplink control channel on the BWP and data signaling on an uplink shared channel on the set of frequency domain resources.

In some examples of the method, apparatuses, and non-transitory computer-readable medium described herein, the restricted bandwidth for the data signaling corresponds to a maximum bandwidth for the set of frequency domain resources or a maximum number of physical resource blocks for the set of frequency domain resources, or both.

A method for wireless communications at a network entity is described. The method may include receiving an indication of a capability of a UE to support a restricted bandwidth for data signaling, transmitting an indication of a BWP for control signaling and an indication of a set of frequency domain resources for the data signaling, where the set of frequency domain resources corresponds to a subset of the BWP in accordance with the restricted bandwidth, and communicating the control signaling over the BWP and data signaling over the set of frequency domain resources.

An apparatus for wireless communications at a network entity is described. The apparatus may include a processor, memory coupled with the processor, and instructions stored in the memory. The instructions may be executable by the processor to cause the apparatus to receive an indication of a capability of a UE to support a restricted bandwidth for data signaling, transmit an indication of a BWP for control signaling and an indication of a set of frequency domain resources for the data signaling, where the set of frequency domain resources corresponds to a subset of the BWP in accordance with the restricted bandwidth, and communicate the control signaling over the BWP and data signaling over the set of frequency domain resources.

Another apparatus for wireless communications at a network entity is described. The apparatus may include means for receiving an indication of a capability of a UE to support a restricted bandwidth for data signaling, means for transmitting an indication of a BWP for control signaling and an indication of a set of frequency domain resources for the data signaling, where the set of frequency domain resources corresponds to a subset of the BWP in accordance with the restricted bandwidth, and means for communicating the control signaling over the BWP and data signaling over the set of frequency domain resources.

A non-transitory computer-readable medium storing code for wireless communications at a network entity is described. The code may include instructions executable by a processor to receive an indication of a capability of a UE to support a restricted bandwidth for data signaling, transmit an indication of a BWP for control signaling and an indication of a set of frequency domain resources for the data signaling, where the set of frequency domain resources corresponds to a subset of the BWP in accordance with the restricted bandwidth, and communicate the control signaling over the BWP and data signaling over the set of frequency domain resources.

In some examples of the method, apparatuses, and non-transitory computer-readable medium described herein, transmitting the indication of the set of frequency domain resources may include operations, features, means, or instructions for transmitting an indication of a first physical resource block of a set of consecutive physical resource blocks in the set of frequency domain resources.

In some examples of the method, apparatuses, and non-transitory computer-readable medium described herein, transmitting the indication of the set of frequency domain resources may include operations, features, means, or instructions for transmitting an indication of a position from a set of candidate positions for the set of frequency domain resources within the BWP.

In some examples of the method, apparatuses, and non-transitory computer-readable medium described herein, transmitting the indication of the set of frequency domain resources may include operations, features, means, or instructions for transmitting an indication of a set of one or more resource block groups for the set of frequency domain resources.

In some examples of the method, apparatuses, and non-transitory computer-readable medium described herein, transmitting the indication of the set of frequency domain resources may include operations, features, means, or instructions for transmitting an indication of a first physical resource block of the set of frequency domain resources within the BWP and a quantity of physical resource blocks for the set of frequency domain resources.

In some examples of the method, apparatuses, and non-transitory computer-readable medium described herein, transmitting the indication of the set of frequency domain resources may include operations, features, means, or instructions for transmitting an indication of one or more frequency hopping configurations for the set of frequency domain resources.

Some examples of the method, apparatuses, and non-transitory computer-readable medium described herein may further include operations, features, means, or instructions for transmitting an indication of a frequency hopping configuration from the one or more frequency hopping configurations, where communicating the data signaling may be in accordance with the frequency hopping configuration based on the indication of the frequency hopping configuration.

In some examples of the method, apparatuses, and non-transitory computer-readable medium described herein, transmitting the indication of the BWP may include operations, features, means, or instructions for transmitting a first configuration for the BWP as a first BWP for the control signaling, where transmitting the indication of the set of frequency domain resources includes transmitting a second configuration for the set of frequency domain resources as a second BWP for the data signaling in accordance with the restricted bandwidth.

In some examples of the method, apparatuses, and non-transitory computer-readable medium described herein, the second configuration includes a frequency domain resource assignment indicator which indicates the second BWP or a BWP index out of a set of multiple BWP indexes, or both.

In some examples of the method, apparatuses, and non-transitory computer-readable medium described herein, receiving the indication of the capability may include operations, features, means, or instructions for receiving the indication of the capability via a random access preamble message or a radio resource control message, or both.

DETAILED DESCRIPTION

Figure 1:
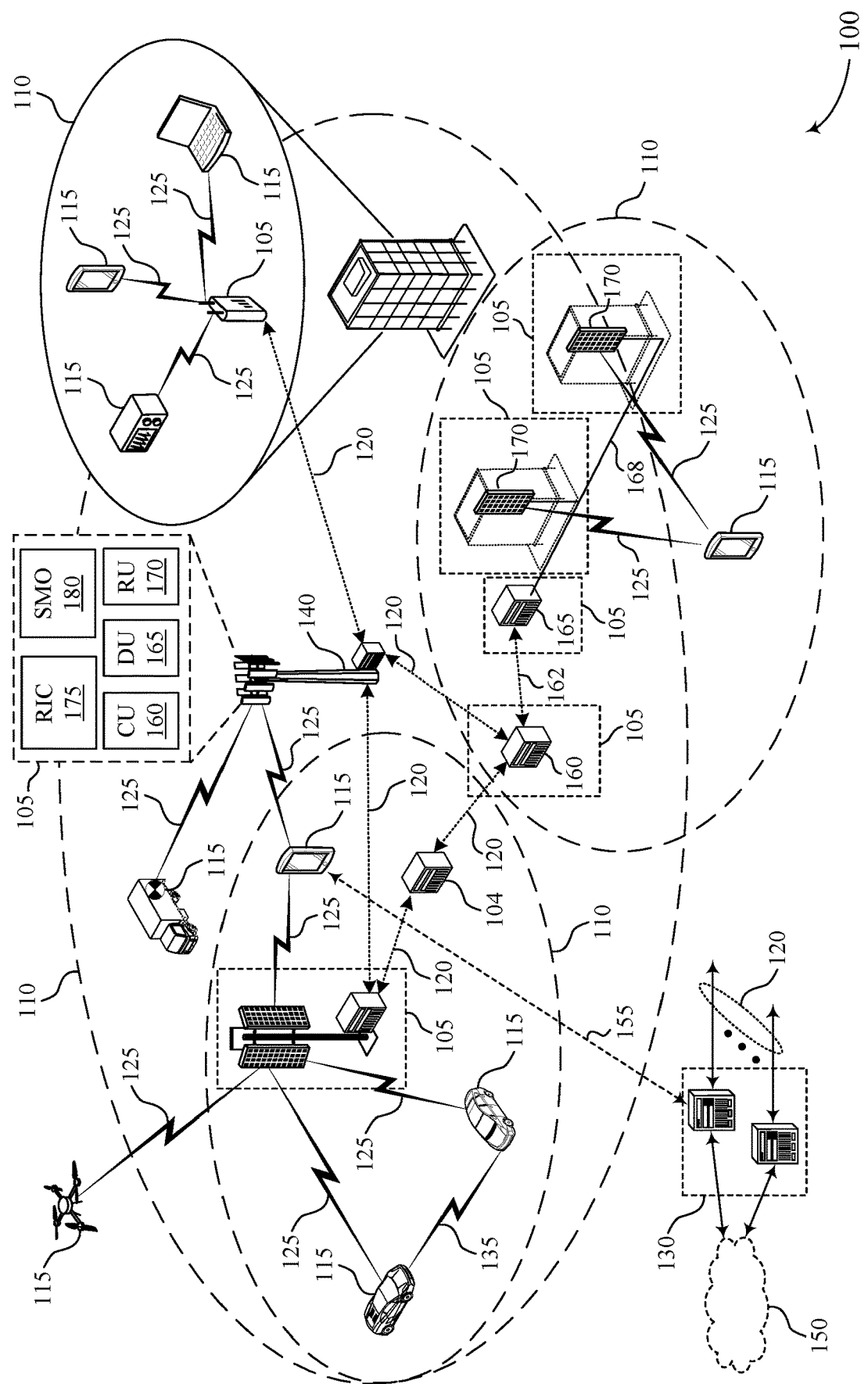
FIG. 1 illustrates an example of a wireless communications system that supports frequency resource allocation for reduced capability devices in accordance with one or more aspects of the present disclosure.

Some wireless communications systems may support user equipment (UEs) with different capabilities. For examples, a wireless communications system may support higher capability UEs with low latency and high data throughput, such as UEs that support ultra-reliable low latency communications (URLLC). The wireless communications system may also support lower capability UEs, or reduced capability UEs, with lower peak data throughput and relaxed latency and reliability requirements. Some wireless communications systems may restrict a data bandwidth for reduced capability devices to decrease complexity and requirements for the reduced capability devices.

This disclosure provides techniques to allocate bandwidth for data signaling to a UE in accordance with a restricted bandwidth for data signaling. For example, a UE, such as a reduced capability UE, may be restricted to a certain bandwidth size or a number of physical resource blocks (PRBs) for a data bandwidth. In some examples, the UE may be configured with a single active bandwidth part (BWP), and a bandwidth for data signaling or shared channel signaling may be a subset of the single active BWP used for control signaling. In some cases, the UE may be allocated a data bandwidth which is less than or equal to a certain size (e.g., in Megahertz (MHz)) or a certain percentage of the single active BWP. For example, the active BWP may be 20 MHz, and the data bandwidth may be 5 MHz. In another example, the UE may be allocated up to a certain number of PRBs of the active BWP for the data bandwidth. For example, the UE may be allocated up to 25 PRBs for the data bandwidth in a 15 kilohertz (kHz) subcarrier spacing (SCS) configuration or up to 12 PRBs for the data bandwidth in a 30 kHz SCS configuration. In some examples, the UE may be configured with a first BWP for control signaling and a second BWP for data signaling in accordance with a restricted bandwidth for the data signaling. For example, the second BWP for data signaling may be confined by the first BWP for control signaling and may be configured with a bandwidth size up to a maximum (e.g., restricted) bandwidth size. Techniques for allocating the control and data bandwidths are described herein, such as different techniques for type 0 and type 1 frequency resource allocation signaling.

In some examples, the UE may be configured to perform frequency hopping for the data bandwidth. For example, the data bandwidth may move in frequency (e.g., hop) to provide frequency diversity and reduce interference. The UE may be configured with multiple hops and corresponding offsets in the frequency domain for each hop. For example, each frequency offset may be an offset in the frequency domain from a reference point in the BWP for control signaling. The hopping pattern may sweep the data bandwidth across the entire BWP for control signaling or across a portion of the BWP for control signaling. In some examples, the UE may be configured with multiple hopping patterns, and the UE may be indicated a hopping pattern to use from the multiple hopping patterns. A frequency hopping configuration may include a hop switching gap to provide time for the UE to perform signal processing, such as filtering or down-sampling.

In some examples, the UE may transmit an indication of a UE capability to support the restricted bandwidth. For example, the UE may transmit an indication of a type of the UE, which may indicate that the UE is a reduced capability UE. The UE may transmit the indication of the UE capability to a network entity, such as during a random access procedure. For example, the UE may indicate the UE capability via a random access preamble message (e.g., a first message of a random access procedure) or a Radio Resource Control (RRC) message (e.g., a third message of the random access procedure), or both. In some cases, additional messages of the random access procedure may be communicated on resources of a data bandwidth or control BWP allocated in accordance with the restricted bandwidth after indicating the UE capability.

Aspects of the disclosure are initially described in the context of wireless communications systems. Aspects of the disclosure are further illustrated by and described with reference to apparatus diagrams, system diagrams, and flowcharts that relate to frequency resource allocation for reduced capability devices.

FIG. 1 illustrates an example of a wireless communications system 100 that supports frequency resource allocation for reduced capability devices in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support frequency resource allocation for reduced capability devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support UEs 115 with different capabilities. For examples, the wireless communications system 100 may support higher capability UEs 115, such as UEs 115 that support URLLC, and lower capability UEs 115, such as reduced capability UEs 115, reduced capability evolution UEs 115, or both. Reduced capability UEs 115 and reduced capability evolution UEs 115 may be used, for example, for low-tier or low-requirement IoT services, such as metering devices, asset tracing, or personal IoT equipment, such as smart devices.

In some examples, the wireless communications system 100 may restrict a data bandwidth, or a broadband bandwidth, for reduced capability UEs 115 to decrease complexity and requirements for the reduced capability UEs 115. For example, a data bandwidth for a reduced capability UE 115 may be restricted to a certain bandwidth size, such as up to 5 MHz. In some examples, the restricted bandwidth for data signaling may be implemented with a relaxed UE processing timeline for downlink shared channel or uplink shared channel signaling, or both, and CSI reporting. Additionally, or alternatively, the wireless communications system 100 may implement techniques to reduce a peak data rate for a reduced capability UE 115. For example, configuring the reduced capability UE 115 with the restricted bandwidth for data signaling may reduce the UE peak data rate. In some cases, the relaxed UE processing timeline may additionally reduce the UE peak data rate.

In some examples, the wireless communications system 100 may support techniques to configure frequency domain resources for control signaling and frequency domain resources for data signaling. For example, a UE 115 may be configured with broadcast channels which may be used for control channels or control signaling. A broadcast channel, or a bandwidth for control signaling, may have a 20 MHz bandwidth.

The wireless communications system 100 may implement techniques for a reduced or restricted bandwidth for data signaling. For example, frequency resources allocated for data signaling may have restrictions for UE-specific shared channels. For example, a bandwidth for data signaling may be configured to be less than or equal to a certain bandwidth size, such as less than or equal to 5 MHz. In some cases, the number of resource blocks for data signaling may be less than or equal to 25 resource blocks for a 25 kHz SCS configuration or less than or equal to 11 resource blocks for a 30 kHz SCS configuration.

The wireless communications system 100, and wireless communications systems described herein, may implement techniques to allocate bandwidth for data signaling to a UE 115 in accordance with a restricted bandwidth for data signaling. For example, a UE 115, such as a reduced capability UE 115, may be restricted to a certain bandwidth size or a number of PRBs for a data bandwidth. In some examples, the UE may be configured with a single active BWP, and a bandwidth for data signaling or shared channel signaling may be a subset of the single active BWP used for control signaling. In some cases, the UE 115 may be allocated a data bandwidth which is less than or equal to a certain size or a certain percentage of the single active BWP. For example, the active BWP may be 20 MHz, and the data bandwidth may be 5 MHz. In another example, the UE 115 may be allocated up to a certain number of PRBs of the active BWP for the data bandwidth.

In some examples, the UE 115 may be configured with a first BWP for control signaling and a second BWP for data signaling in accordance with a restricted bandwidth for the data signaling. For example, the second BWP for data signaling may be confined by the first BWP for control signaling and may be configured with a bandwidth size up to a maximum (e.g., restricted) bandwidth size. Techniques for allocating the control and data bandwidths are described herein, such as different techniques for Type 0 and Type 1 frequency resource allocation signaling.

A frequency domain resource allocation (FDRA) field in control signaling may indicate a location of a radio frequency spectrum band. In some systems, a Type 0 resource allocation scheme may be used to indicate a location of the radio frequency spectrum band. For example, out of 51 resources blocks (e.g., in a 30 kHz SCS configuration), 13 bits may be used to indicate the RBGs for the radio frequency spectrum band with a resource block group size of 4. For a Type 1 resource allocation scheme, 11 bits may be used to indicate the location of the radio frequency spectrum band in accordance with Equation (1), where $N_{RB}^{BWP}$ corresponds to a number of resource blocks in a BWP.

$$\left\lceil \log_2\left(\frac{N_{RB}^{BWP}(N_{RB}^{BWP}+1)}{2}\right) \right\rceil = 11 \text{ bits} \quad (1)$$

In some examples, the UE 115 may be configured to perform frequency hopping for the data bandwidth. For example, the data bandwidth may move or change positions in the frequency domain (e.g., hop) to provide frequency diversity and reduce interference. The UE 115 may be configured with multiple hops and corresponding offsets in the frequency domain for each hop. For example, each frequency offset may be an offset in the frequency domain from a reference point in the BWP for control signaling, such as a first PRB or PRB0 of the BWP for control signaling.

In some examples, the UE 115 may transmit an indication of a UE capability to support the restricted bandwidth. For example, the UE 115 may transmit an indication of a type of the UE 115, which may indicate that the UE 115 is a reduced capability UE 115. The UE 115 may transmit the indication of the UE capability to a network entity, such as during a random access procedure. For example, the UE 115 may indicate the UE capability via a random access preamble message (e.g., a first message of a random access procedure) or an RRC message (e.g., a third message of the random access procedure), or both. In some cases, additional messages of the random access procedure may be communicated on resources of a data bandwidth or control BWP allocated in accordance with the restricted bandwidth after indicating the UE capability.

Figure 2:
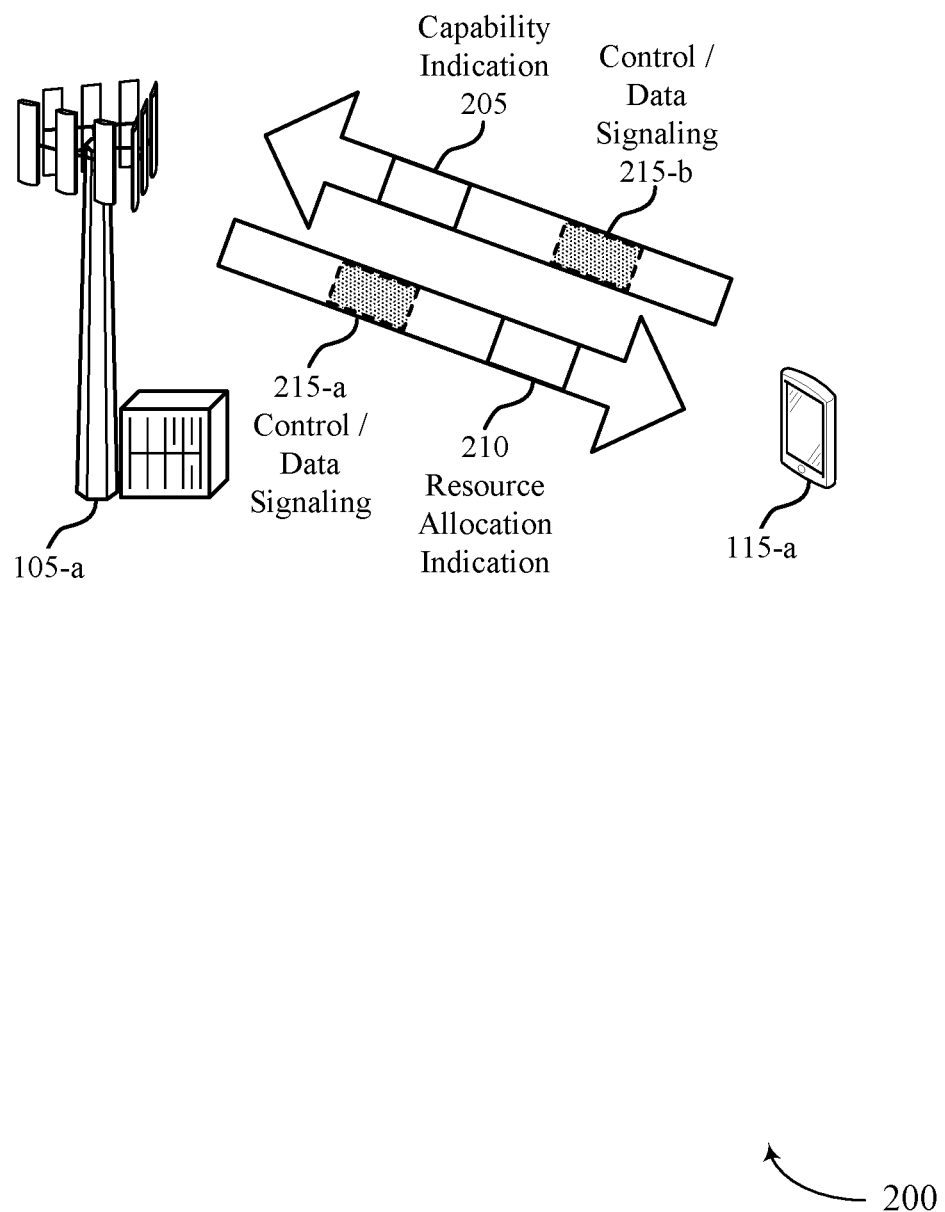
FIG. 2 illustrates an example of a wireless communications systems that supports frequency resource allocation for reduced capability devices in accordance with one or more aspects of the present disclosure.

FIG. 2 illustrates an example of a wireless communications system 200 that supports frequency resource allocation for reduced capability devices in accordance with one or more aspects of the present disclosure. The wireless communications system 200 may include a UE 115-a and a network entity 105-a, which may be respective examples of a UE 115 and a network entity 105 as described with reference to the wireless communications system 100 of FIG. 1.

The wireless communications system 200 may support UEs 115 with different capabilities. For examples, the wireless communications system 200 may support higher capability UEs 115 with low latency and high data throughput, such as UEs 115 that support URLLC. The wireless communications system 200 may also support lower capability UEs 115, or reduced capability UEs 115, with lower peak data throughput and relaxed latency and reliability requirements. In some cases, the UE 115-a may be an example of a reduced capability UE 115.

In some cases, the wireless communications system 200 may restrict a data bandwidth for reduced capability devices to decrease complexity and requirements for the reduced capability devices. For example, frequency domain resources for data signaling may be restricted to a certain bandwidth size. For example, the frequency domain resources for data signaling may be restricted to a 5 MHz bandwidth size or to a certain number of PRBs or resource blocks. Frequency domain resources for control signaling, such as resources for a control resource set, may have bandwidths similar to broadcast channels, such as a 20 MHz bandwidth. In some examples, a data bandwidth (e.g., frequency domain resources for data signaling) may be confined by or included in a control bandwidth (e.g., frequency domain resources for control signaling).

The wireless communications system 200 may support techniques to allocate frequency domain resources for data signaling to a UE 115, such as the UE 115-a, in accordance with a restricted bandwidth for data signaling. In some examples, the UE 115-a may transmit an indication of a UE capability to support the restricted bandwidth. For example, to be configured with a frequency domain allocation resource allocation for data signaling in accordance with the restricted bandwidth, the UE 115-a may transmit a capability indication 205 to the network entity 105-a. The capability indication 205 may indicate a type for the UE 115-a, such as indicating whether the UE 115-a is a reduced capability UE 115, a reduced capability evolution UE 115, a mobile broadband UE 115, or some other type of UE 115 which may support the restricted bandwidth for data signaling.

The network entity 105-a may transmit control signaling including a resource allocation indication 210 to the UE 115-a. The resource allocation indication 210 may configure the UE 115-a with a first BWP for control signaling and frequency domain resources for data signaling. The resource allocation indication 210 may, in some cases, indicate a resource allocation for the data bandwidth in accordance with a type 0 resource allocation or a type 1 resource allocation. For example, the resource allocation indication 210 may indicate a location for the data bandwidth, a size for the data bandwidth, a location of the data bandwidth within the first BWP for control signaling, specific PRBs or resource block groups (RBGs) for the data bandwidth, or any combination thereof. Some additional techniques for allocating the data bandwidth are described in more detail with reference to FIGS. 3 and 5.

In some examples, the frequency domain resources for data signaling may be a portion of the first BWP. For example, the UE 115-a may be configured with a single active BWP, and the frequency domain resources for data signaling may correspond to a portion of the single active BWP. Some examples of these techniques are described in more detail with reference to FIGS. 3 through 6.

In some other examples, the UE 115-a may be configured with a first BWP for control signaling and a second BWP for data signaling in accordance with a restricted bandwidth for the data signaling. For example, the second BWP for data signaling may be confined by the first BWP for control signaling and may be configured with a bandwidth size up to a maximum (e.g., restricted) bandwidth size. Some examples of these techniques are described in more detail with reference to FIGS. 3 and 4.

In some examples, the UE 115-a may be configured to perform frequency hopping for the data bandwidth. For example, the data bandwidth may move in frequency (e.g., hop) to provide frequency diversity and reduce interference. The UE 115-a may be configured with multiple hops and corresponding offsets in the frequency domain for each hop. Some additional techniques for the frequency hopping configurations are described in more detail with reference to FIGS. 4 and 6.

These techniques may be implemented to configure the UE 115-a with a data bandwidth for uplink signaling or downlink signaling. For example, the resource allocation indication 210 may indicate an uplink data bandwidth (e.g., for uplink shared channel signaling) or a downlink data bandwidth (e.g., for downlink shared channel signaling), or both. The UE 115-a may, in some cases, have similar bandwidth restrictions for uplink data signaling and downlink data signaling. For example, an uplink data bandwidth may be restricted to a certain bandwidth size, number of PRBs, number of resource blocks, or number of RBGs. Similarly, a downlink data bandwidth may be restricted to a certain bandwidth size, number of PRBs, number of resource blocks, or number of RBGs. Similar techniques and signaling may be applied to allocate an uplink data bandwidth and a downlink data bandwidth, each of which be in accordance with respective bandwidth restrictions.

For example, the UE 115-a and the network entity 105-a may communicate control or data signaling 215 on the BWP or on the set of frequency domain resources, or both. In some cases, the network entity 105-a may transmit, and the UE 115-a may receive, control or data signaling 215-a. The control or data signaling 215-a may include control signaling on a downlink control channel of the BWP and data signaling on a downlink shared channel of the set of frequency domain resources. Additionally, or alternatively, the UE 115-a may transmit, and the network entity 105-a may receive, control or data signaling 215-b. The control or data signaling 215-b may include control signaling on an uplink control channel of the BWP and data signaling on an uplink shared channel of the set of frequency domain resources.

In some examples, the UE 115-a may transmit the capability indication 205 during a random access procedure. For example, the UE 115-a may indicate the UE capability via a random access preamble message (e.g., a first message of a random access procedure) or an RRC message (e.g., a third message of the random access procedure), or both. If the UE 115-a transmits the capability indication 205 via the first random message, the network entity 105-a may use a broadband bandwidth restriction for downlink shared channel and uplink shared channel signaling (e.g., control or data signaling 215 scheduled on shared channels) during the rest of the random access procedure. In some cases, the UE 115-a or the network entity 105-a, or both, may support or implement random access channel resource portioning for the UE 115-a to transmit the indication of the UE capability via the first random access message.

In some examples, the UE 115-a may transmit the capability indication 205 via a third random access message of a random access procedure. In some systems, a bandwidth exceeding the size of the data bandwidth restriction may be scheduled for data channels used to communicate some messages of the random access procedure. For example, in some systems, larger than 5 MHz may be scheduled for data channels to communicate a second message of the random access procedure (e.g., on a downlink shared channel), a third message of the random access procedure (e.g., on an uplink shared channel), a fourth message of the random access procedure (e.g., on a downlink shared channel), or any combination thereof. After the indication of the UE type (e.g., after the UE 115-a transmits the capability indication 205), the network may assign frequency resources which are no larger than the bandwidth restriction (e.g., 5 MHz) for scheduling of upcoming or future downlink shared channel and uplink shared channel messages, such as downlink shared channel messages or uplink shared channel messages communicated via the control or data signaling 215. In some cases, at least a first system information block (SIB) (e.g., SIB1) and paging PDSCH may still be communicated by up to 20 MHz bandwidth, or bandwidth corresponding to the size of the first BWP for control signaling.

By implementing these techniques, a reduced capability UE 115 such as the UE 115-a may be configured with frequency domain resources for data signaling that are in accordance with a bandwidth restriction or a restricted bandwidth. By communicating (e.g., receiving or transmitting) data signaling on the frequency domain resources in accordance with the bandwidth restriction, complexity may be reduced or requirements may be eased for data signaling at the UE 115-a.

Figure 3:
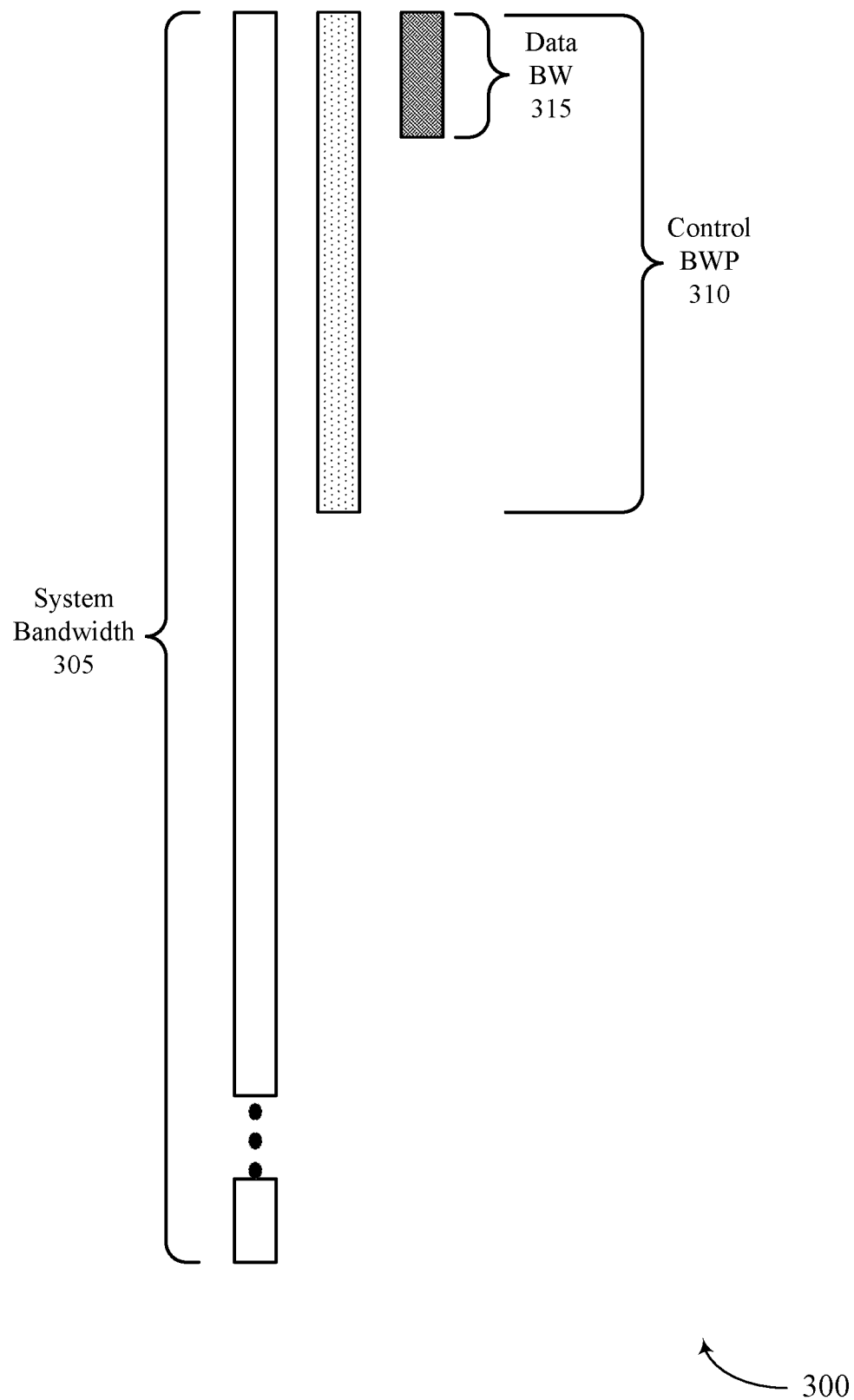
FIG. 3 illustrates an example of a restricted bandwidth resource allocation configuration that supports frequency resource allocation for reduced capability devices in accordance with one or more aspects of the present disclosure.

FIG. 3 illustrates an example of a restricted bandwidth resource allocation configuration 300 that supports frequency resource allocation for reduced capability devices in accordance with one or more aspects of the present disclosure. The restricted bandwidth resource allocation configuration 300 may be supported by a UE 115 or a network entity 105, or both, for uplink signaling or downlink signaling, or both.

A UE 115 may transmit an indication of a capability for the UE 115 to support a restricted bandwidth for data signaling. For example, the UE 115 may be an example of a reduced capability UE 115, and the UE 115 may indicate its type (e.g., as a reduced capability UE 115) to a network entity 105. The UE 115 may receive (e.g., from a network entity 105) control signaling indicating a first frequency domain resource allocation for control signaling or a second frequency domain resource allocation for data signaling, or both. For example, within a system bandwidth 305, the UE 115 may receive an indication of a control BWP 310 for control signaling and a data bandwidth 315 for data signaling. The control BWP 310 may be configured in accordance with the restricted bandwidth, which may reduce complexity for data signaling at the UE 115.

In some example, the UE 115 may be configured with a single active BWP. For example, the control BWP 310 for control signaling may be the single active BWP, and data bandwidth 315 may correspond to a subset of resources within the control BWP 310. For example, the bandwidth restriction may be that the data bandwidth 315 is to have at most a certain bandwidth size. In some cases, the data bandwidth 315 may be configured to be less than or equal to 5 MHz, although the bandwidth restriction or maximum bandwidth size may be different in other scenarios or deployments. In some examples, the data bandwidth 315 may include contiguous or connected PRBs, resource blocks, or RBGs, or the data bandwidth 315 may include non-contiguous or separated PRBs, resource blocks, or RBGs.

In some cases, the control BWP 310 may have up to a maximum size for a BWP. For example, the control BWP 310 may have a bandwidth size of up to 20 MHz. In some cases, a control resource set size may be configured to span up to the maximum size for the BWP. For example, a control resource set for the UE 115 may span up to 20 MHz.

An FDRA field may allocate the data bandwidth 315 to the UE 115 in accordance with one or more resource allocation schemes. For example, the UE 115 may be allocated the data bandwidth 315 in accordance with a type 0 resource allocation scheme. For a type 0 resource allocation scheme, the resource allocation indication may indicate a bandwidth position of the data bandwidth 315 within the control BWP 310. For example, the resource allocation indication may indicate a first PRB of the data bandwidth 315. Indicating the first PRB of the data bandwidth 315 may provide a flexible position of the data bandwidth 315 within the control BWP 310. In some cases, indicating the first PRB of the data bandwidth 315 may use six bits.

In another example, the resource allocation indication may indicate a position of the data bandwidth 315 within the control BWP 310. For example, there may be multiple candidate positions for the data bandwidth 315 within the control BWP 310, and the resource allocation indication (e.g., a value of the FDRA field) may indicate a position of the data bandwidth 315 from the multiple candidate positions. For example, there may be four candidate locations for a 5 MHz data bandwidth within a 20 MHz active BWP, and the resource allocation indication may use two bits. In some cases, the resource allocation indication may indicate an RBG for a certain number of PRBs of the data bandwidth 315. For example, the FDRA field may indicate RBGs for 11 PRBs with an RBG size of 2, using 6 bits.

In some examples, the UE 115 may be indicated the data bandwidth 315 in accordance with a type 1 resource allocation scheme. For a type 1 resource allocation scheme, the resource allocation indication may indicate a first PRB of the data bandwidth 315 and a number of PRBs. For example, the resource allocation indication may indicate any one of 51 RBs of the control BWP 310 and a quantity of PRBs for the size of the control BWP 310 (e.g., up to 11 RBs in a 30 kHz SCS configuration). Some examples of the type 1 resource allocation scheme may use 9 bits in accordance with Equation (2), where $N_{RB}^{BB\ Max}$ corresponds to a number of resource blocks in a maximum size of a baseband bandwidth (e.g., 11 resource blocks in a 5 MHz bandwidth for a 30 kHz SCS configuration).

$$\left\lceil \log_2 \left\{ \frac{N_{RB}^{BB\ Max}\left(N_{RB}^{BB\ Max}+1\right)}{2} + N_{RB}^{BB\ Max}\left(N_{RB}^{DL\ BWP} - N_{RB}^{BB\ Max}\right) \right\} \right\rceil = 9 \text{ bits} \quad (2)$$

In some examples, the UE 115 may be configured with separate BWPs for control channels and data channels. For example, the UE 115 may be configured with the control BWP 310 and the data bandwidth 315 as a data BWP. The control BWP 310 may have a bandwidth size up to the maximum bandwidth for an active BWP (e.g., up to 20 MHz), and the data BWP, or the data bandwidth 315 in this example, may have a maximum bandwidth size in accordance with the bandwidth restriction. For example, the data BWP may have a bandwidth size of up to 5 MHz. In some example, the data BWP may be confined within the control BWP. In some cases, the data BWP and the control BWP may be separately configured. For example, the UE 115 may receive separate control signaling to configure the data BWP and the control BWP 310.

In some cases, the data BWP may be semi-statically configured. For example, the network entity 105 may transmit downlink control information (DCI) which includes an FDRA field for the data BWP. The FDRA field may, for example, indicate the location or size, or both, of the data BWP in the frequency domain within the control BWP 310. In some examples, the data BWP may be dynamically changed or updated by DCI signaling. For example, the network entity 105 may transmit DCI indicating a BWP index for the data BWP. The BWP index may correspond to a location of the data BWP from a set candidate locations for the data BWP. In some examples, the DCI may include the BWP index and an FDRA field for the data BWP, which may indicate a size or, in some cases, a location in the frequency domain of the data BWP.

These techniques may be used for uplink signaling or downlink signaling, or both. For example, the control BWP 310 may be an example of a BWP configured for uplink control channels, and the data bandwidth 315 may be an example of a radio frequency spectrum band, or a BWP, configured for uplink data channels. In some other examples, the control BWP 310 may be an example of a BWP configured for downlink control channels, and the data bandwidth 315 may be an example of a radio frequency spectrum band, or a BWP, configured for downlink data channels. While the control BWP 310 is generally described as a BWP for control channels and control signaling and the data bandwidth 315 is generally described as a radio frequency spectrum band for data signaling, the control BWP 310 or the data bandwidth 315, or both, may be used for control signaling or data signaling, or both, on control channels or data channels, or both.

Figure 4:
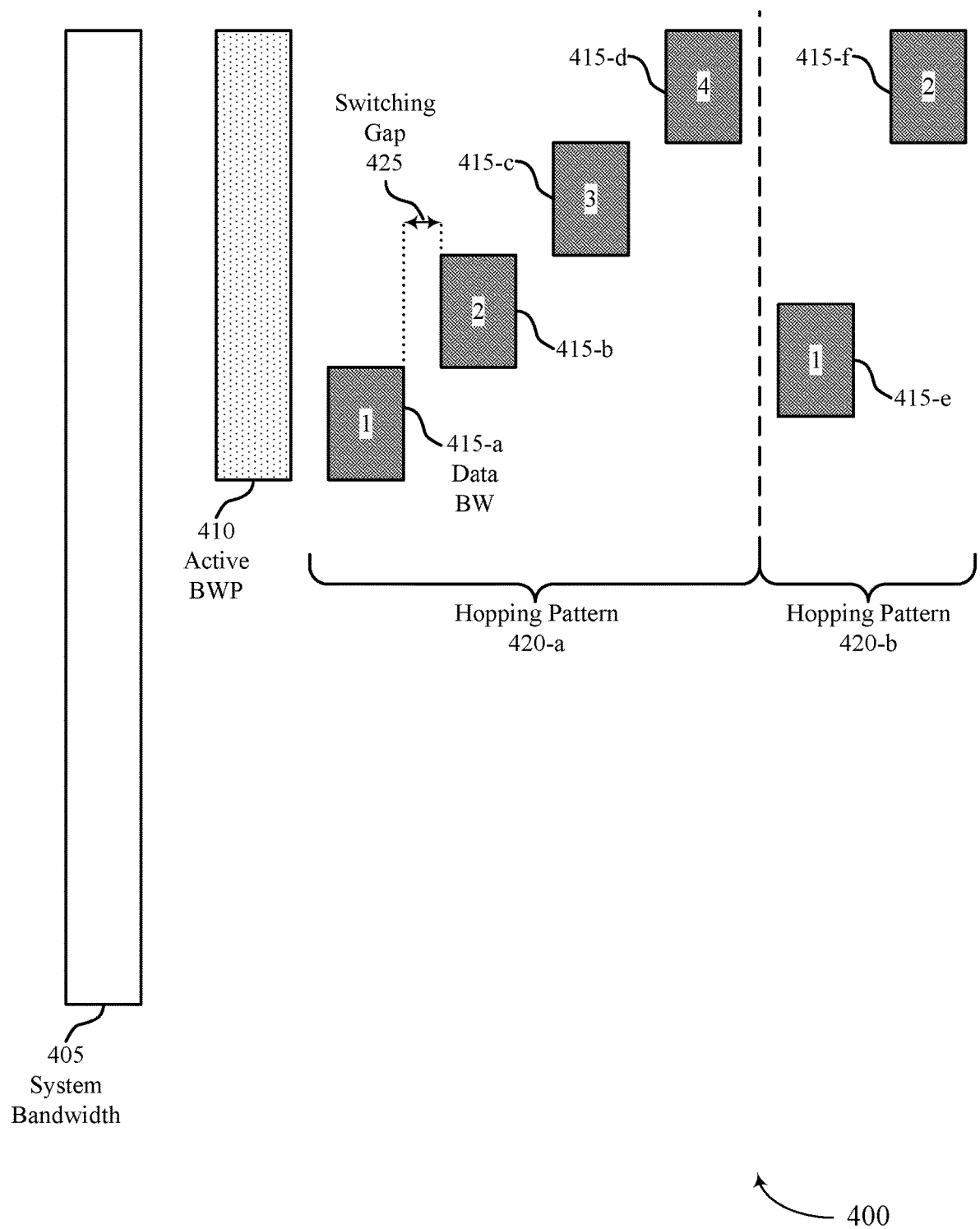
FIG. 4 illustrates an example of a frequency hopping configuration that supports frequency resource allocation for reduced capability devices in accordance with one or more aspects of the present disclosure.

FIG. 4 illustrates an example of a frequency hopping configuration 400 that supports frequency resource allocation for reduced capability devices in accordance with one or more aspects of the present disclosure. The frequency hopping configuration 400 may be supported by a UE 115 or a network entity 105, or both, for uplink signaling or downlink signaling, or both.

A UE 115 may transmit an indication of a capability for the UE 115 to support a restricted bandwidth for data signaling. For example, the UE 115 may be an example of a reduced capability UE 115, and the UE 115 may indicate its type (e.g., as a reduced capability UE 115) to a network entity 105. The UE 115 may receive (e.g., from a network entity 105) control signaling indicating a first frequency domain resource allocation for control signaling or a second frequency domain resource allocation for data signaling, or both. For example, within a system bandwidth 405, the UE 115 may receive an indication of a control BWP 410 for control signaling and a data bandwidth 415 for data signaling. The data bandwidth 415 may be configured in accordance with the restricted bandwidth, which may reduce complexity for data signaling at the UE 115. Some examples of the signaling to configure the control BWP 410 and the data bandwidth 415 are described in more detail with reference to FIG. 3. In some cases, the data bandwidth 415 may be an example of a subset of the control BWP, or the data bandwidth 415 may be an example of a separately configured BWP for data channels.

In some examples, the UE 115 may be configured to perform frequency hopping for the data bandwidth. For example, the data bandwidth 415 may move in frequency (e.g., hop) to provide frequency diversity and reduce interference. The UE 115 may be configured with multiple hops and corresponding offsets in the frequency domain for each hop.

In some example, a network entity 105 may transmit control signaling indicating the frequency hopping configuration to the UE 115. The frequency hopping configuration may include one or more hopping patterns 420 and one or more hop switching gaps 425. A hopping pattern 420 may include one or more hops, or locations in the frequency domain, for the data bandwidth 415 at different instances. In some cases, the frequency hopping configuration may include an offset for each hop of a hopping pattern. A hop switching gap 425 may be a time gap between hops of the hopping pattern 420, which may enable the UE 115 to perform signal processing, such as filtering, down-sampling, and the like.

For example, the UE 115-a may be configured with a first hopping pattern 420-a. For the first hopping pattern 420-a, the data bandwidth 415-a may be in a first position in the frequency domain. For example, a first PRB of the data bandwidth 415-a may be aligned with a first PRB of the control BWP 410. For a second instance of the first hopping pattern, the data bandwidth 415 may move or change to a different position in the frequency domain. For example, at a second hop, the UE 115 may use a data bandwidth 415-b, which may be in a different position in the frequency domain than data bandwidth 415-a. In the example of the first hopping pattern 420-a, there may be four hops, including the data bandwidth 415-a and the data bandwidth 415-b, as well as a data bandwidth 415-c and a data bandwidth 415-d. There may be a hop switching gap 425 (e.g., in the time domain) between each instance of the data bandwidth 415. The first hopping pattern 420-a may be an example of a hopping pattern which sweeps or spans the entire bandwidth of the control BWP 410.

In a second example, the UE 115-a may be configured with a second hopping pattern 420-b. The second hopping pattern 420-b may include a different number of hops than the first hopping pattern 420-a or span a different range in the frequency domain. For example, the second hopping pattern 420-b may include two hops, such as the frequency bandwidth 415-e and the frequency bandwidth 415-f. In some cases, the second hopping pattern 420-b may span or sweep a portion of the control BWP 410.

For each hop in a hopping pattern 420, there may be a corresponding frequency offset with respect to a reference point. For example, the data bandwidth 415-a may be a first hop and may be associated with a first offset from some reference point in the control BWP 410 or the system bandwidth 405, or both. For example, the data bandwidth 415-a may have a frequency offset of 0 from the control BWP 410. The data bandwidth 415-b may be a second hop of the same hopping pattern and may be associated with a second offset from the reference point. For example, the data bandwidth 415-b may have an offset of 12 PRBs (e.g., in a 30 kHz SCS configuration), or 5 MHz. The offsets may, in some cases, be defined with respect to PRBs, resource blocks, RBGs, or frequency, or any combination thereof.

In some cases, the UE 115 may be configured with multiple hopping patterns. For example, the UE 115 may be configured with both the first hopping pattern 420-a and the second hopping pattern 420-b. The UE 115 may receive (e.g., from a network entity 105) an indication of one of the hopping patterns 420, and the UE 115-a may communicate on the data bandwidth 415 in accordance with the indicated hopping pattern 420. In some examples, the UE 115 may use a single hopping pattern at a time. The multiple hopping patterns 420 may, in some cases, be configured via RRC signaling. A hopping pattern 420 may be selected or indicated via DCI signaling or a MAC control element.

Figure 5:
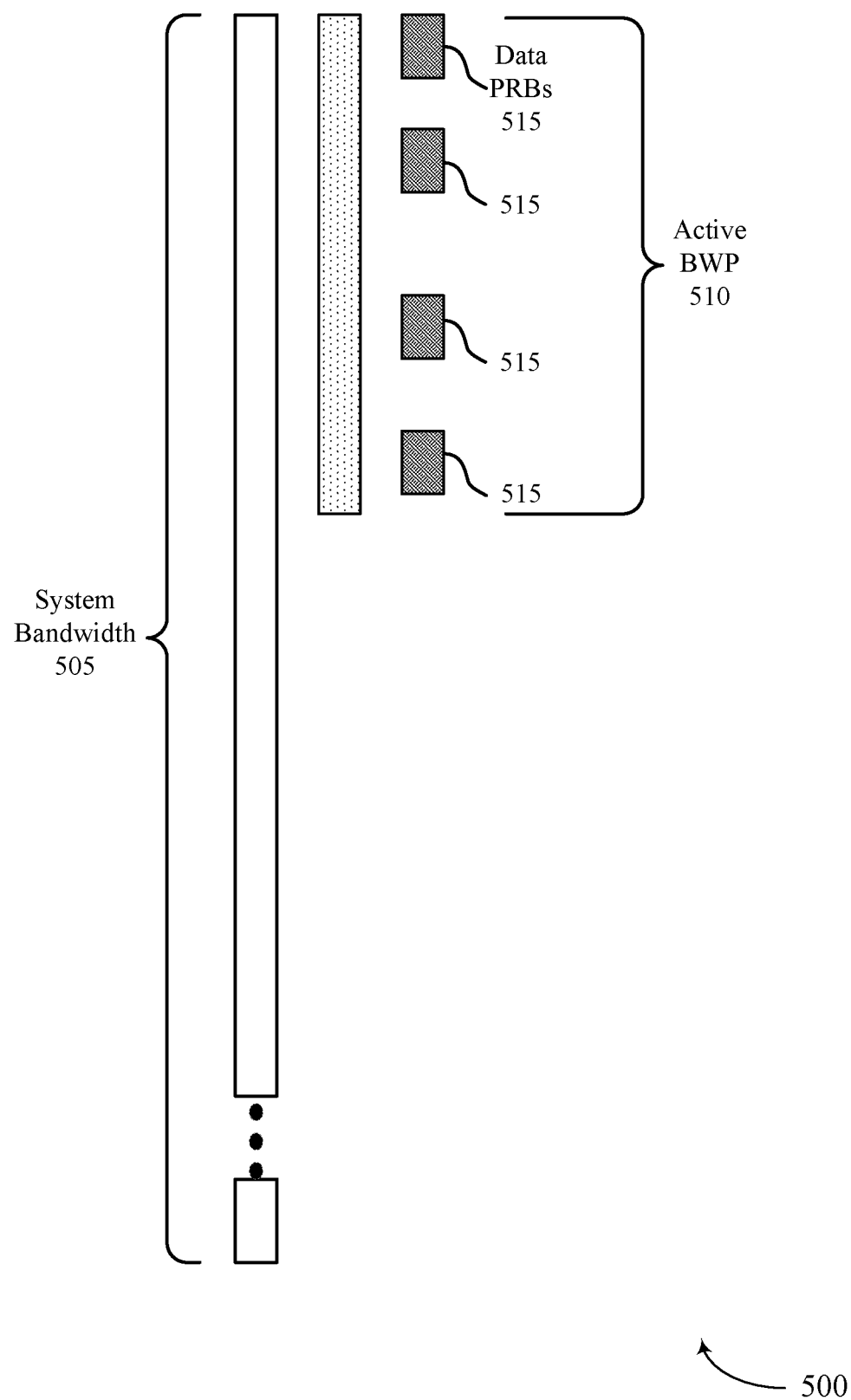
FIG. 5 illustrates an example of a restricted bandwidth resource allocation configuration that supports frequency resource allocation for reduced capability devices in accordance with one or more aspects of the present disclosure.

FIG. 5 illustrates an example of a restricted bandwidth resource allocation configuration 500 that supports frequency resource allocation for reduced capability devices in accordance with one or more aspects of the present disclosure. The restricted bandwidth resource allocation configuration 500 may be supported by a UE 115 or a network entity 105, or both, for uplink signaling or downlink signaling, or both.

A UE 115 may transmit an indication of a capability for the UE 115 to support a restricted bandwidth for data signaling. For example, the UE 115 may be an example of a reduced capability UE 115, and the UE 115 may indicate its type (e.g., as a reduced capability UE 115) to a network entity 105. The UE 115 may receive (e.g., from a network entity 105) control signaling indicating a first frequency domain resource allocation for control signaling or a second frequency domain resource allocation for data signaling, or both. For example, within a system bandwidth 505, the UE 115 may receive an indication of a control BWP 510 for control signaling and a data bandwidth 515 for data signaling. The data bandwidth 515 may be configured in accordance with the restricted bandwidth, which may reduce complexity for data signaling at the UE 115.

In some example, the UE 115 may be configured with a single active BWP. For example, the control BWP 510 for control signaling may be the single active BWP, and data bandwidth 515 may correspond to a subset of resources within the control BWP 510. For example, the bandwidth restriction may be that the data bandwidth 515 is to have at most a certain number of PRBs for data scheduling. In some cases, the data bandwidth 515 may be configured to have fewer than or equal to 25 PRBs for a 15 kHz SCS configuration or fewer than or equal to 12 PRBs for a 30 kHz SCS configuration, although the bandwidth restriction or number of PRBs may be different in other scenarios or deployments. In some examples, the data bandwidth 515 may include contiguous or connected PRBs, resource blocks, or RBGs, or the data bandwidth 515 may include non-contiguous or separated PRBs, resource blocks, or RBGs.

In some examples, an FDRA field may allocate the data bandwidth 515 to the UE 115 in accordance with one or more resource allocation schemes. For example, the UE 115 may be allocated the data bandwidth 515 in accordance with a type 0 resource allocation scheme. For example, the network entity 105 may allocate the data bandwidth 515 using a type 0 resource allocation scheme with a restriction on total allocation, such as restricting the size of the data bandwidth 515 in the frequency domain to up to 11 resource blocks or a certain number of PRBs. For a type 1 resource allocation scheme, the network entity may indicate the PRBs of the data bandwidth 515, up to the restricted number of PRBs for the data bandwidth 515.

These techniques may be used for uplink signaling or downlink signaling, or both. For example, the control BWP 510 may be an example of a BWP configured for uplink control channels, and the data bandwidth 515 may be an example of a radio frequency spectrum band, or a BWP, configured for uplink data channels. In some other examples, the control BWP 510 may be an example of a BWP configured for downlink control channels, and the data bandwidth 515 may be an example of a radio frequency spectrum band, or a BWP, configured for downlink data channels. While the control BWP 510 is generally described as a BWP for control channels and control signaling and the data bandwidth 515 is generally described as a radio frequency spectrum band for data signaling, the control BWP 510 or the data bandwidth 515, or both, may be used for control signaling or data signaling, or both, on control channels or data channels, or both.

Figure 6:
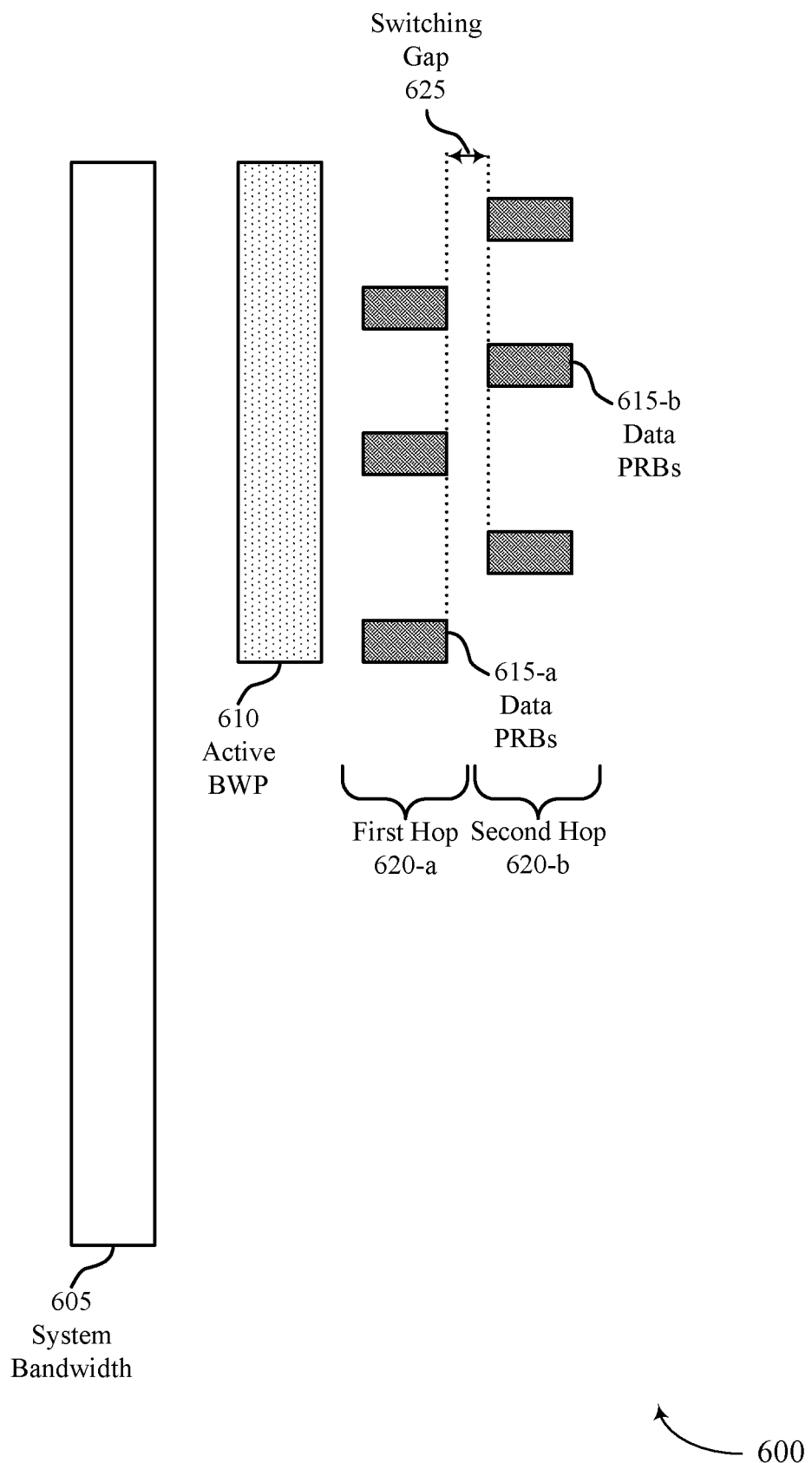
FIG. 6 illustrates an example of a frequency hopping configuration that supports frequency resource allocation for reduced capability devices in accordance with one or more aspects of the present disclosure.

FIG. 6 illustrates an example of a frequency hopping configuration 600 that supports frequency resource allocation for reduced capability devices in accordance with one or more aspects of the present disclosure. The frequency hopping configuration 600 may be supported by a UE 115 or a network entity 105, or both, for uplink signaling or downlink signaling, or both.

A UE 115 may receive, from a network entity 105, an indication of a control BWP 610 for control signaling and a data bandwidth 615 for data signaling within a system bandwidth 605. The data bandwidth 615 may be configured in accordance with the restricted bandwidth, which may reduce complexity for data signaling at the UE 115. Some examples of the signaling to configure the control BWP 610 and the data bandwidth 615 are described in more detail with reference to FIG. 5. In some cases, the data bandwidth 615 may be an example of a subset of the control BWP.

In some examples, the UE 115 may be configured to perform frequency hopping configuration for the data bandwidth. For example, the data bandwidth 615 may move in frequency (e.g., hop) to provide frequency diversity and reduce interference. The UE 115 may be configured with multiple hops 620 and corresponding offsets in the frequency domain for each hop 620.

In some example, a network entity 105 may transmit control signaling indicating the frequency hopping configuration to the UE 115. The frequency hopping configuration may include one or more hopping patterns and one or more hop switching gaps 625. A hopping pattern may include one or more hops 620, or locations in the frequency domain, for the data bandwidth 615 at different instances. A hop switching gap 625 may be a time gap between hops 620 of the hopping pattern, which may enable the UE 115 to perform signal processing, such as filtering, down-sampling, and the like. In some cases, the UE 115 may be configured with multiple hopping patterns, as described in more detail with reference to FIG. 4.

In some cases, the frequency hopping configuration may include an offset for each hop 620 of a hopping pattern. In the example of the frequency hopping configuration 600, each hop 620 may represent multiple fixed PRBs. For example, at a first hop 620-*a*, the data PRBs 615-*a* may be in first positions in the frequency domain. At a second hop 620-*b*, the data PRBs 615-*b* may have moved in the frequency domain to be in second positions in the frequency domain. A hopping pattern may sweep or spans the entire bandwidth of the control BWP 610 or a portion of the control BWP 610.

Figure 7:
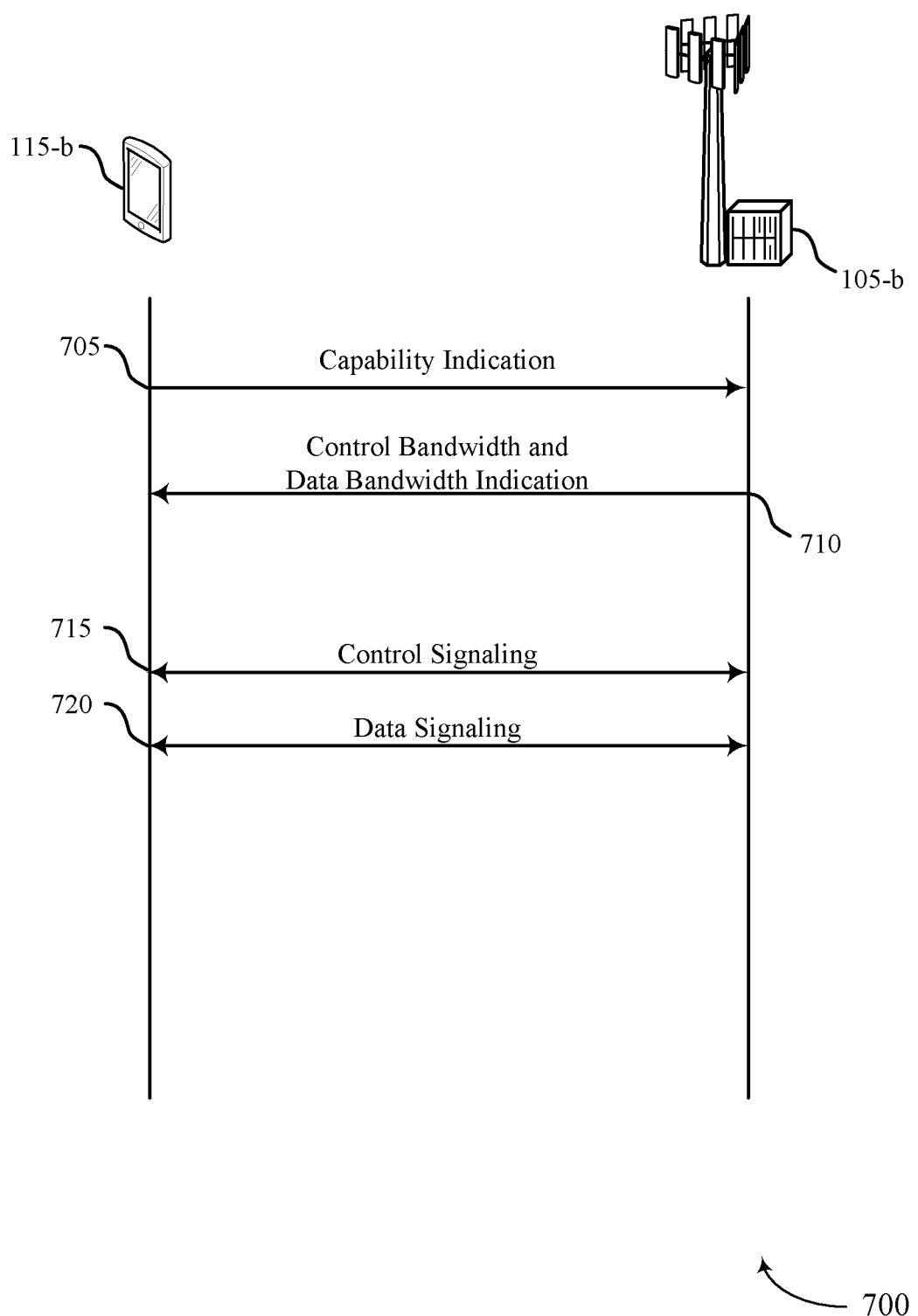
FIG. 7 illustrates an example of a process flow that supports frequency resource allocation for reduced capability devices in accordance with one or more aspects of the present disclosure.

FIG. 7 illustrates an example of a process flow 700 that supports frequency resource allocation for reduced capability devices in accordance with one or more aspects of the present disclosure. The process flow 700 may be implemented by a UE 115-*b* or a network entity 105-*b*, or both. In some cases, some operations or signaling of the process flow 700 may occur in a different order than shown. Additionally, or alternatively, some additional signaling or operations may occur, or some signaling or operations shown may not occur, or both.

At 705, the UE 115-*b* may transmit an indication of a capability of the UE 115-*b* to support a restricted bandwidth for data signaling. For example, the UE 115-*b* may transmit a capability indication of the UE 115-*b*, indicating that the UE 115-*b* is a reduced capability UE 115. For example, the UE 115-*b* may indicate support for the restricted bandwidth for data signaling, which may limit the UE 115-*b* to, for example, a 5 MHz bandwidth for data channels or a certain number of PRBs for a data bandwidth, or both. In some examples, the UE 115-*b* may transmit the indication of the capability in a random access message. For example, the UE 115-*b* may transmit the indication of the capability via a first random access message or a third random access message, or both. In some cases, the UE 115-*b* may transmit the indication of the capability via RRC signaling.

At 710, the UE 115-*b* may receive an indication of a BWP for control signaling and an indication of a set of frequency domain resources for the data signaling. The set of frequency domain resources may correspond to a subset of the BWP in accordance with the restricted bandwidth. For example, the set of frequency domain resources may be an example of a data bandwidth, which may be configured in accordance with the bandwidth restriction. In some cases, the network entity 105-*b* may transmit the indication of the BWP and the indication of the set of frequency domain resources for the data signaling.

In some cases, the UE 115-*b* may be configured with a single active BWP, such as the BWP for control signaling. The set of frequency domain resources may, be a portion of the BWP for control signaling, such as being a radio frequency spectrum band in the BWP that is in accordance with the restricted bandwidth. For example, the set of frequency domain resources may be configured to be up to a certain bandwidth size, such as 5 MHz or smaller. Additionally, or alternatively, the set of frequency domain resources may include at most a certain number of PRBs, such as 25 PRBs or 12 PRBs for kHz and 30 kHz SCS configurations, respectively.

In some examples, the UE 115-*b* may be configured with separate BWPs for control and data channels. For example, the set of frequency domain resources may be configured as a BWP for data channels. The BWP for the data channels may be configured in accordance with the restricted bandwidth (e.g., up to a certain bandwidth size, such as 5 MHz).

In some cases, the UE 115-*b* may receive an indication of one or more frequency hopping configurations for the set of frequency domain resources. For example, the UE 115-*b* may receive a frequency hopping configuration for the data bandwidth, which may provide improved frequency diversity and interference aversion for data signaling on the data bandwidth. In some cases, each frequency hopping configuration may include one or more hopping patterns. A hopping pattern may include a set of frequency offsets corresponding to a set of hops for the data bandwidth. In some cases, the frequency offsets may be with reference to a reference point in the control BWP or a system bandwidth, or both. In some cases, the UE 115-*b* may receive the indication of the frequency hopping configurations via RRC signaling. In some examples, the UE 115-*b* may receive an indication of multiple frequency hopping configurations or multiple hopping patterns. The network entity 105-*b* may select or indicate a hopping pattern, or switch between hopping patterns, by transmitting an indication in control signaling, such as DCI.

At 715, the UE 115-*b* may communicate the control signaling over the BWP, and at 720, the UE 115-*b* may communicate the data signaling over the frequency domain resources. These techniques may be implemented to configure a data bandwidth in accordance with a restricted bandwidth for uplink signaling or downlink signaling, or both. In some cases, the UE 115-*b* may transmit the control signaling on an uplink control channel on the BWP and transmit the data signaling on an uplink shared channel in the set of frequency domain resources. In some other examples, the UE 115-*b* may receive the control signaling on a downlink control channel on the BWP and receive the data signaling on a downlink shared channel in the set of frequency domain resources. In some cases, the UE 115-*b* and the network entity 105-*b* may communicate the data signaling and the control signaling.

Figure 8:
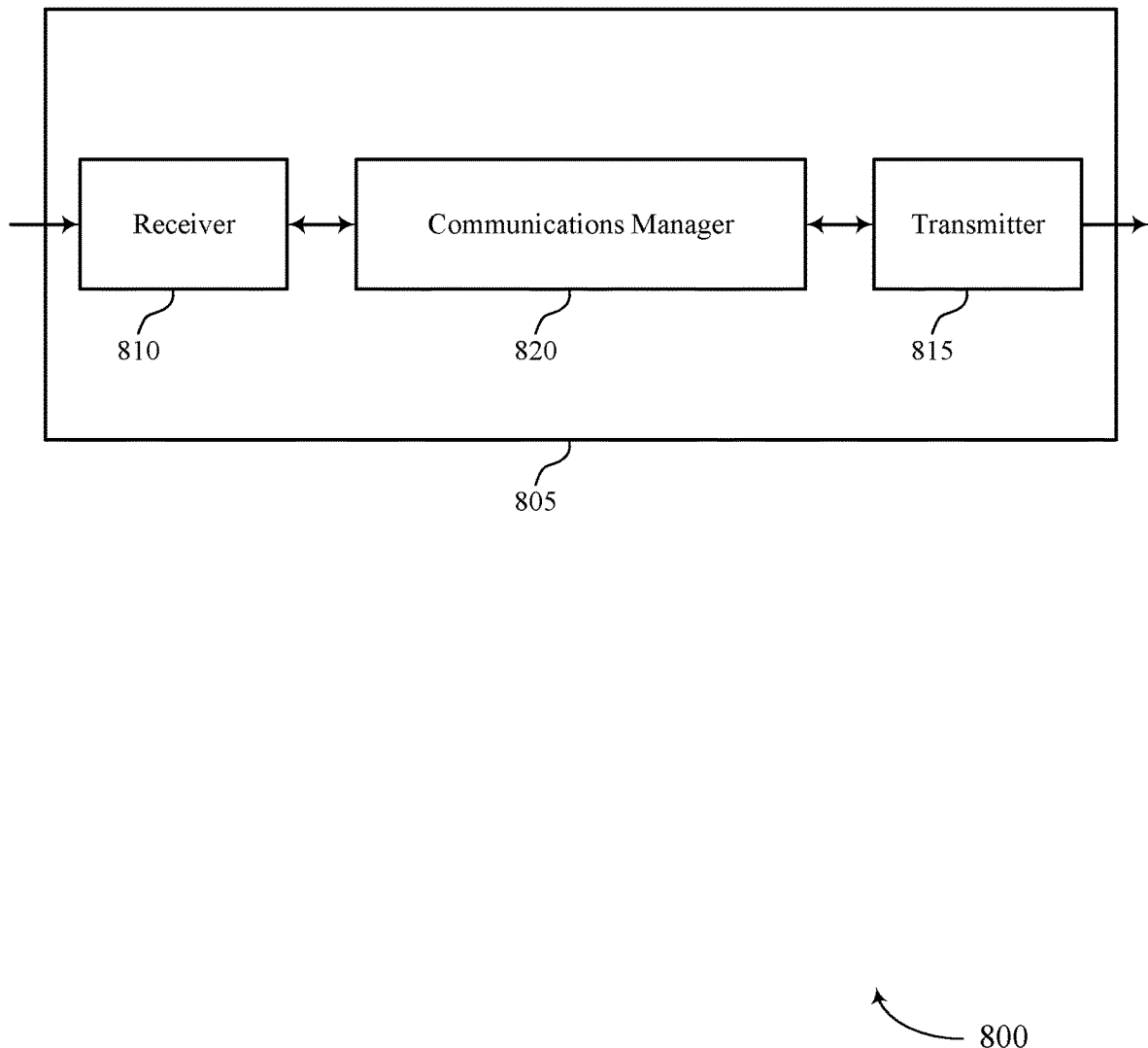
FIGS. 8 and 9 show block diagrams of devices that support frequency resource allocation for reduced capability devices in accordance with one or more aspects of the present disclosure.

FIG. 8 shows a block diagram 800 of a device 805 that supports frequency resource allocation for reduced capability devices in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to frequency resource allocation for reduced capability devices). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to frequency resource allocation for reduced capability devices). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of frequency resource allocation for reduced capability devices as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 may be configured as or otherwise support a means for transmitting an indication of a capability of the UE to support a restricted bandwidth for data signaling. The communications manager 820 may be configured as or otherwise support a means for receiving an indication of a BWP for control signaling and an indication of a set of frequency domain resources for the data signaling, where the set of frequency domain resources corresponds to a subset of the BWP in accordance with the restricted bandwidth. The communications manager 820 may be configured as or otherwise support a means for communicating the control signaling over the BWP and data signaling over the set of frequency domain resources.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced complexity for data signaling by using a data bandwidth that is allocated in accordance with a bandwidth restriction. The bandwidth restriction may decrease complexity for data signaling for lower capability devices. These techniques may improve backward compatibility or scalability in wireless communications systems with multiple types of devices.

Figure 9:
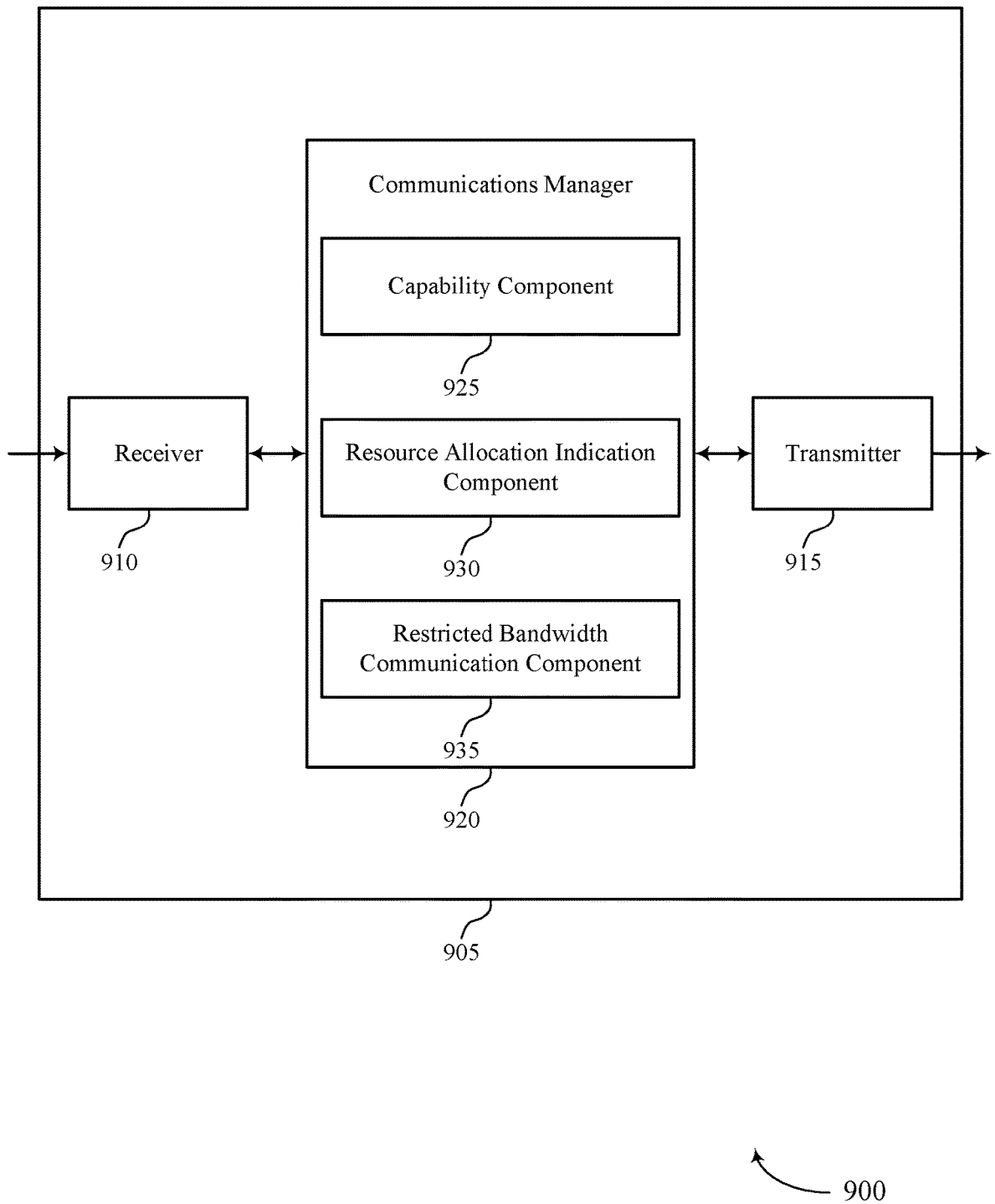

FIG. 9 shows a block diagram 900 of a device 905 that supports frequency resource allocation for reduced capability devices in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to frequency resource allocation for reduced capability devices). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to frequency resource allocation for reduced capability devices). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of frequency resource allocation for reduced capability devices as described herein. For example, the communications manager 920 may include a capability component 925, a resource allocation indication component 930, a restricted bandwidth communication component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The capability component 925 may be configured as or otherwise support a means for transmitting an indication of a capability of the UE to support a restricted bandwidth for data signaling. The resource allocation indication component 930 may be configured as or otherwise support a means for receiving an indication of a BWP for control signaling and an indication of a set of frequency domain resources for the data signaling, where the set of frequency domain resources corresponds to a subset of the BWP in accordance with the restricted bandwidth. The restricted bandwidth communication component 935 may be configured as or otherwise support a means for communicating the control signaling over the BWP and data signaling over the set of frequency domain resources.

Figure 10:
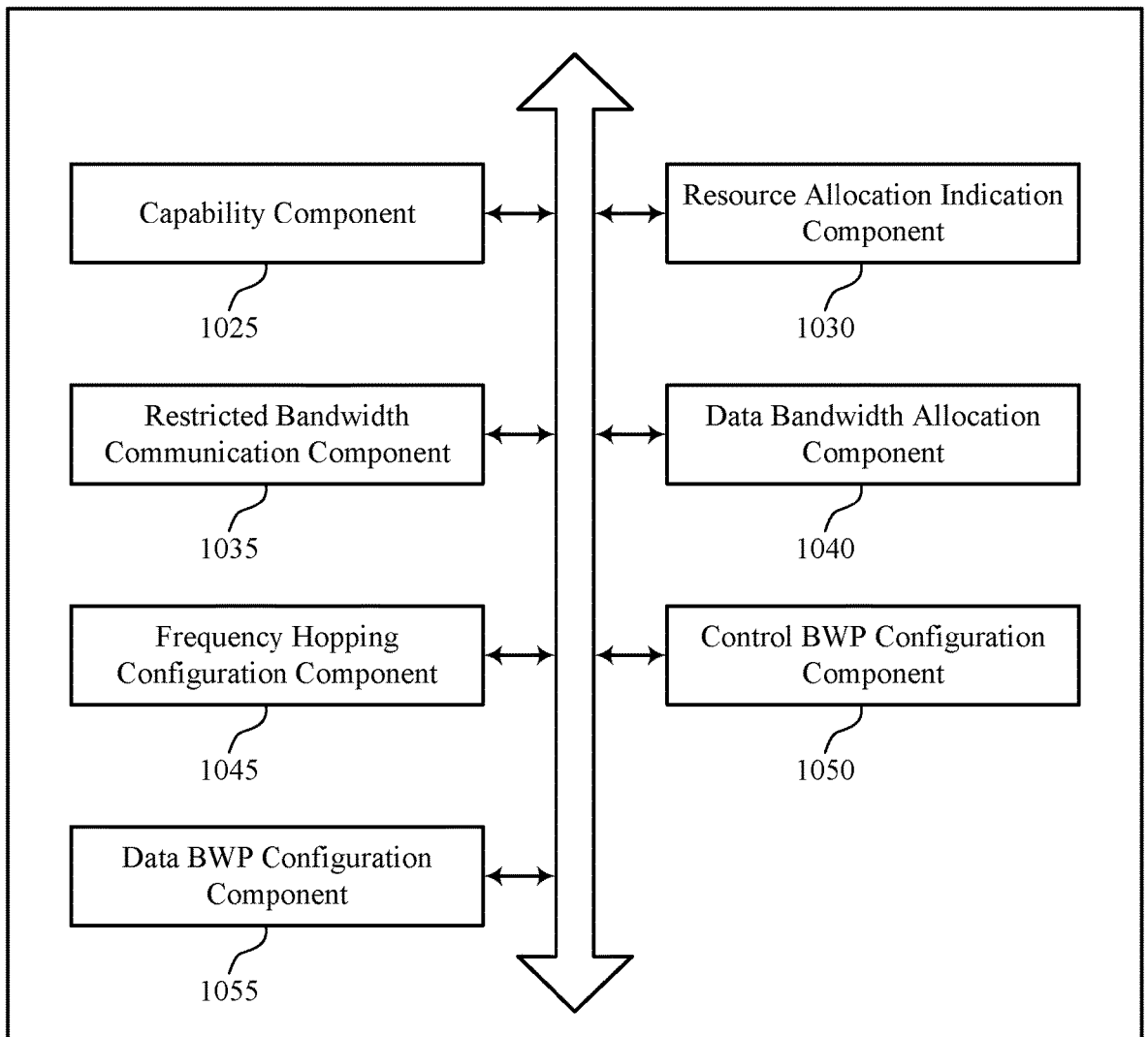
FIG. 10 shows a block diagram of a communications manager that supports frequency resource allocation for reduced capability devices in accordance with one or more aspects of the present disclosure.

FIG. 10 shows a block diagram 1000 of a communications manager 1020 that supports frequency resource allocation for reduced capability devices in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of frequency resource allocation for reduced capability devices as described herein. For example, the communications manager 1020 may include a capability component 1025, a resource allocation indication component 1030, a restricted bandwidth communication component 1035, a data bandwidth allocation component 1040, a frequency hopping configuration component 1045, a control BWP configuration component 1050, a data BWP configuration component 1055, or any combination thereof. Each of these components may communicate, directly or indirectly, with one another (e.g., via one or more buses).

The communications manager 1020 may support wireless communications at a UE in accordance with examples as disclosed herein. The capability component 1025 may be configured as or otherwise support a means for transmitting an indication of a capability of the UE to support a restricted bandwidth for data signaling. The resource allocation indication component 1030 may be configured as or otherwise support a means for receiving an indication of a BWP for control signaling and an indication of a set of frequency domain resources for the data signaling, where the set of frequency domain resources corresponds to a subset of the BWP in accordance with the restricted bandwidth. The restricted bandwidth communication component 1035 may be configured as or otherwise support a means for communicating the control signaling over the BWP and data signaling over the set of frequency domain resources.

In some examples, to support receiving the indication of the set of frequency domain resources, the data bandwidth allocation component 1040 may be configured as or otherwise support a means for receiving an indication of a first physical resource block of a set of consecutive physical resource blocks in the set of frequency domain resources.

In some examples, to support receiving the indication of the set of frequency domain resources, the data bandwidth allocation component 1040 may be configured as or otherwise support a means for receiving an indication of a position from a set of candidate positions for the set of frequency domain resources within the BWP.

In some examples, to support receiving the indication of the set of frequency domain resources, the data bandwidth allocation component 1040 may be configured as or otherwise support a means for receiving an indication of a set of one or more resource block groups for the set of frequency domain resources.

In some examples, to support receiving the indication of the set of frequency domain resources, the data bandwidth allocation component 1040 may be configured as or otherwise support a means for receiving an indication of a first physical resource block of the set of frequency domain resources within the BWP and a quantity of physical resource blocks for the set of frequency domain resources.

In some examples, to support receiving the indication of the set of frequency domain resources, the frequency hopping configuration component 1045 may be configured as or otherwise support a means for receiving an indication of one or more frequency hopping configurations for the set of frequency domain resources.

In some examples, each frequency hopping configuration of the one or more frequency hopping configurations includes a set of multiple frequency offsets corresponding to a set of multiple hops, and the set of multiple frequency offsets are defined according to a reference point in the BWP.

In some examples, the set of frequency domain resources spans an entirety of the BWP or a portion of the BWP over a set of multiple hops in accordance with the one or more frequency hopping configurations.

In some examples, each frequency hopping configuration of the one or more frequency hopping configurations includes a switching time between a first hop of the set of frequency domain resources and a second hop of the set of frequency domain resources.

In some examples, the frequency hopping configuration component 1045 may be configured as or otherwise support a means for receiving an indication of a frequency hopping configuration from the one or more frequency hopping configurations, where communicating the data signaling is in accordance with the frequency hopping configuration based on the indication of the frequency hopping configuration.

In some examples, to support receiving the indication of the BWP, the control BWP configuration component 1050 may be configured as or otherwise support a means for receiving a first configuration for the BWP as a first BWP for the control signaling; and where receiving the indication of the set of frequency domain resources includes. In some examples, to support receiving the indication of the BWP, the data BWP configuration component 1055 may be configured as or otherwise support a means for receiving a second configuration for the set of frequency domain resources as a second BWP for the data signaling in accordance with the restricted bandwidth.

In some examples, the second configuration includes a frequency domain resource assignment indicator which indicates the second BWP. In some examples, the second configuration indicates a BWP index out of a set of multiple BWP indexes for the second BWP.

In some examples, to support transmitting the indication of the capability, the capability component 1025 may be configured as or otherwise support a means for transmitting the indication of the capability via a random access preamble message or a radio resource control message, or both.

In some examples, the capability component 1025 may be configured as or otherwise support a means for receiving one or more message of a random access procedure on the BWP or the set of frequency domain resources, or both, based on transmitting the indication of the capability.

In some examples, communicating includes monitoring for the control signaling on a downlink control channel on the BWP and data signaling on a downlink shared channel on the set of frequency domain resources. In some examples, communicating includes transmitting the control signaling on an uplink control channel on the BWP and data signaling on an uplink shared channel on the set of frequency domain resources. In some examples, the restricted bandwidth for the data signaling corresponds to a maximum bandwidth for the set of frequency domain resources or a maximum number of physical resource blocks for the set of frequency domain resources, or both.

Figure 11:
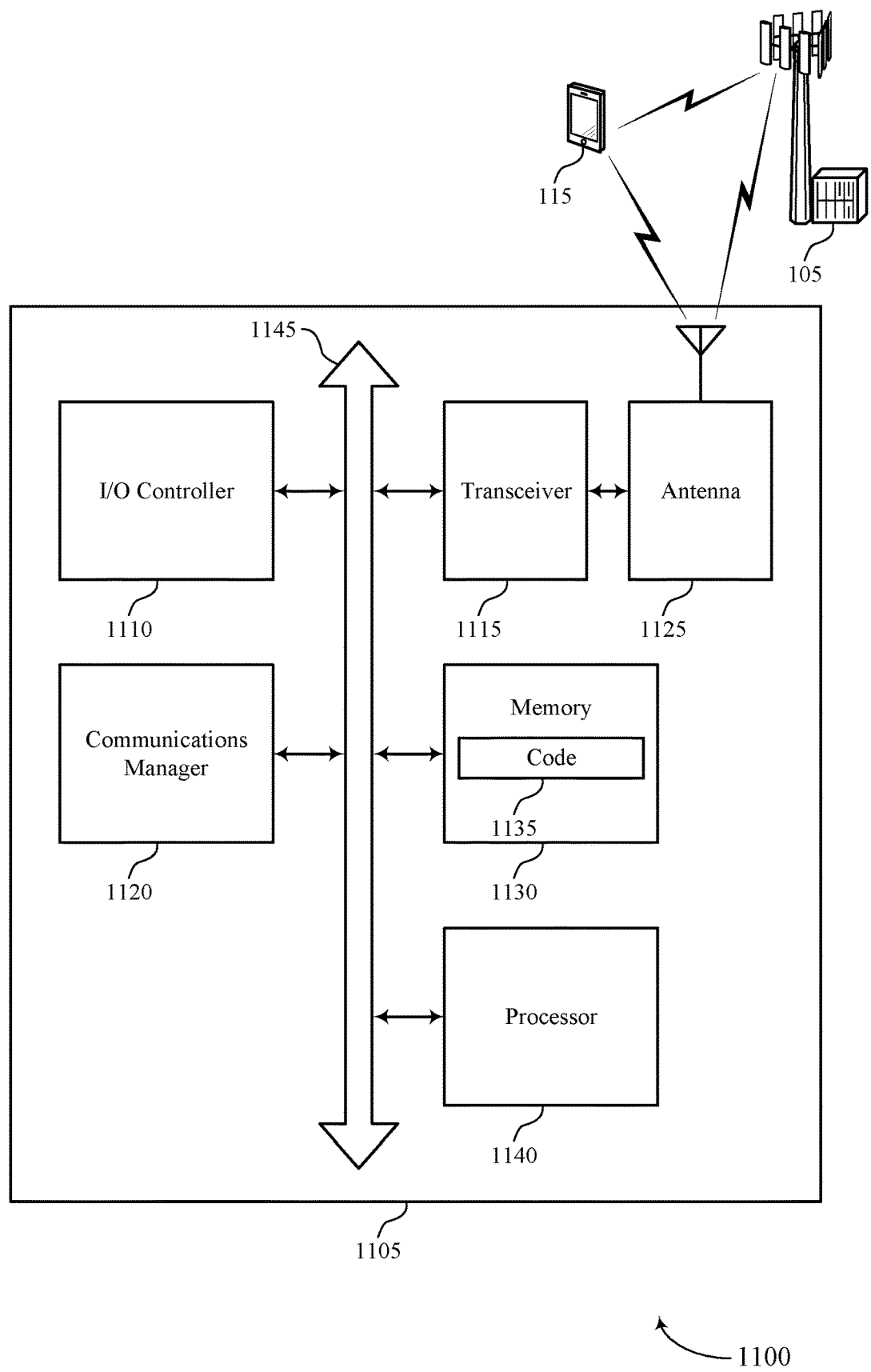
FIG. 11 shows a diagram of a system including a device that supports frequency resource allocation for reduced capability devices in accordance with one or more aspects of the present disclosure.

FIG. 11 shows a diagram of a system 1100 including a device 1105 that supports frequency resource allocation for reduced capability devices in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting frequency resource allocation for reduced capability devices). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for transmitting an indication of a capability of the UE to support a restricted bandwidth for data signaling. The communications manager 1120 may be configured as or otherwise support a means for receiving an indication of a BWP for control signaling and an indication of a set of frequency domain resources for the data signaling, where the set of frequency domain resources corresponds to a subset of the BWP in accordance with the restricted bandwidth. The communications manager 1120 may be configured as or otherwise support a means for communicating the control signaling over the BWP and data signaling over the set of frequency domain resources.

By including or configuring the communications manager 1120 in accordance with examples as described herein, the device 1105 may support techniques for reduced complexity for data signaling by using a data bandwidth that is allocated in accordance with a bandwidth restriction. The bandwidth restriction may decrease complexity for data signaling for lower capability devices, which may reduce power usage at the device 1105.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of frequency resource allocation for reduced capability devices as described herein, or the processor 1140 and the memory 1130 may be otherwise configured to perform or support such operations.

Figure 12:
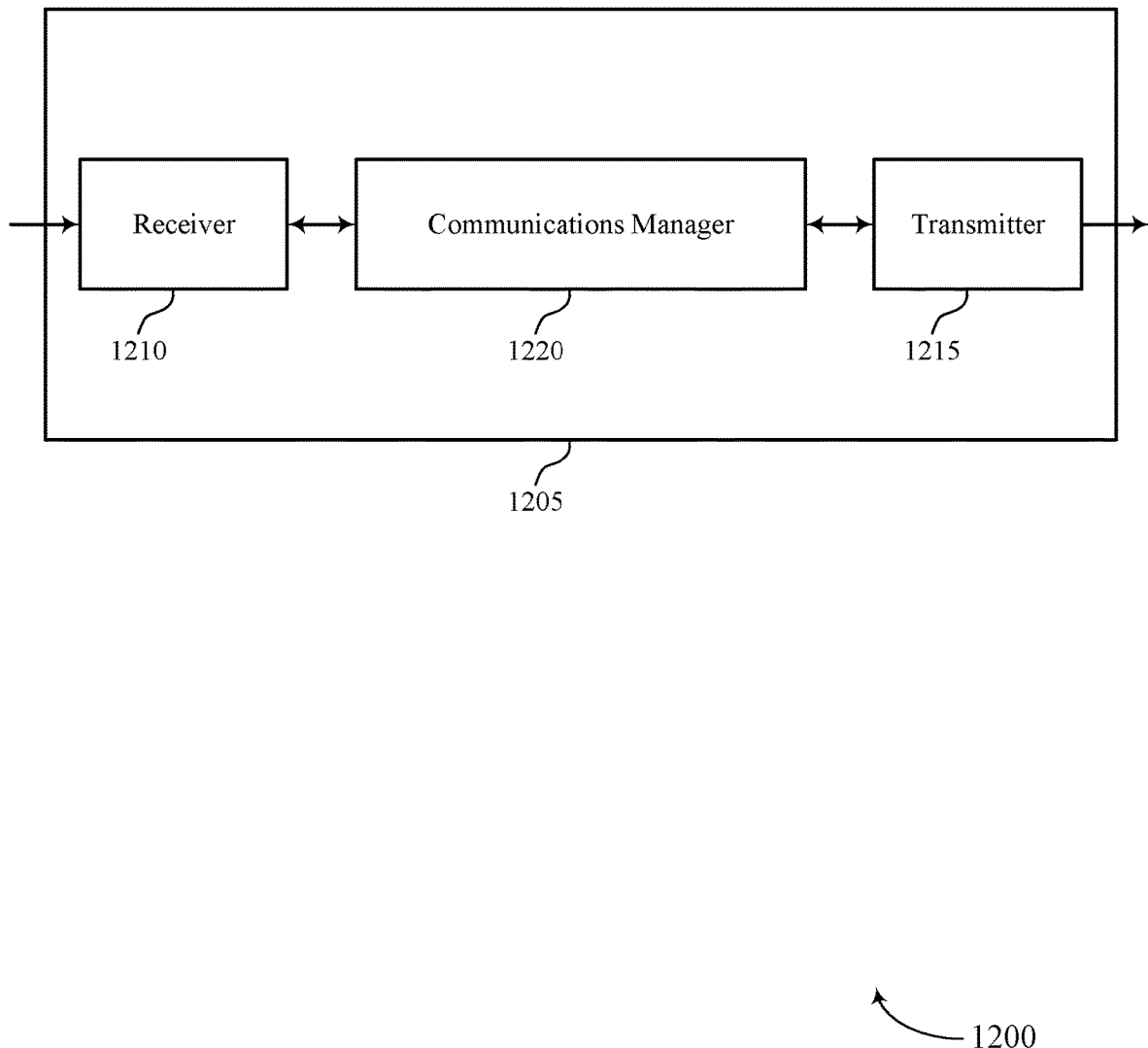
FIGS. 12 and 13 show block diagrams of devices that support frequency resource allocation for reduced capability devices in accordance with one or more aspects of the present disclosure.

FIG. 12 shows a block diagram 1200 of a device 1205 that supports frequency resource allocation for reduced capability devices in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of frequency resource allocation for reduced capability devices as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. For example, the communications manager 1220 may be configured as or otherwise support a means for receiving an indication of a capability of a UE to support a restricted bandwidth for data signaling. The communications manager 1220 may be configured as or otherwise support a means for transmitting an indication of a BWP for control signaling and an indication of a set of frequency domain resources for the data signaling, where the set of frequency domain resources corresponds to a subset of the BWP in accordance with the restricted bandwidth. The communications manager 1220 may be configured as or otherwise support a means for communicating the control signaling over the BWP and data signaling over the set of frequency domain resources.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced complexity for data signaling by using a data bandwidth that is allocated in accordance with a bandwidth restriction. The bandwidth restriction may decrease complexity for data signaling for lower capability devices. These techniques may improve backward compatibility or scalability in wireless communications systems with multiple types of devices, which may decrease overhead.

Figure 13:
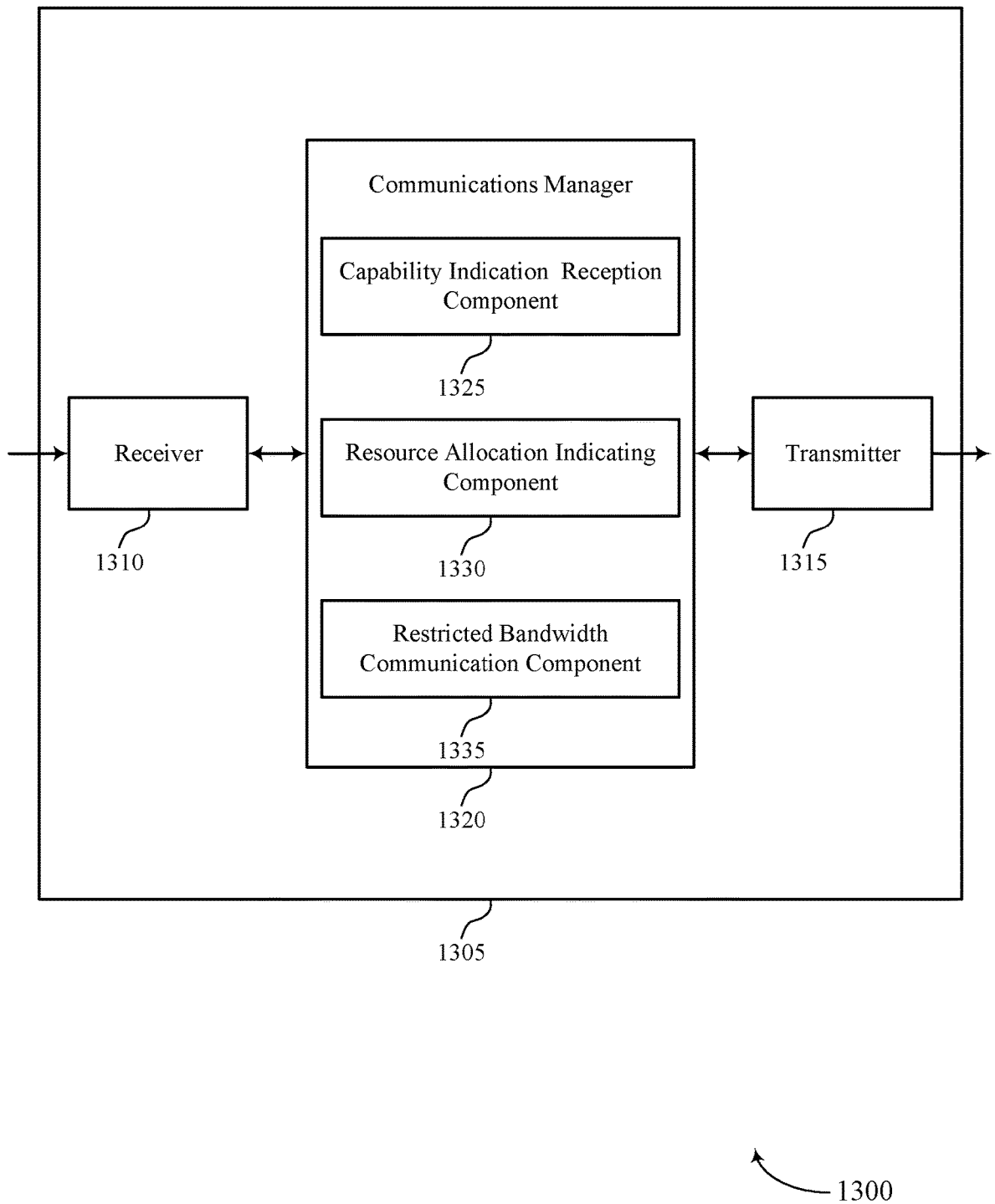

FIG. 13 shows a block diagram 1300 of a device 1305 that supports frequency resource allocation for reduced capability devices in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of frequency resource allocation for reduced capability devices as described herein. For example, the communications manager 1320 may include a capability indication reception component 1325, a resource allocation indicating component 1330, a restricted bandwidth communication component 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. The capability indication reception component 1325 may be configured as or otherwise support a means for receiving an indication of a capability of a UE to support a restricted bandwidth for data signaling. The resource allocation indicating component 1330 may be configured as or otherwise support a means for transmitting an indication of a BWP for control signaling and an indication of a set of frequency domain resources for the data signaling, where the set of frequency domain resources corresponds to a subset of the BWP in accordance with the restricted bandwidth. The restricted bandwidth communication component 1335 may be configured as or otherwise support a means for communicating the control signaling over the BWP and data signaling over the set of frequency domain resources.

Figure 14:
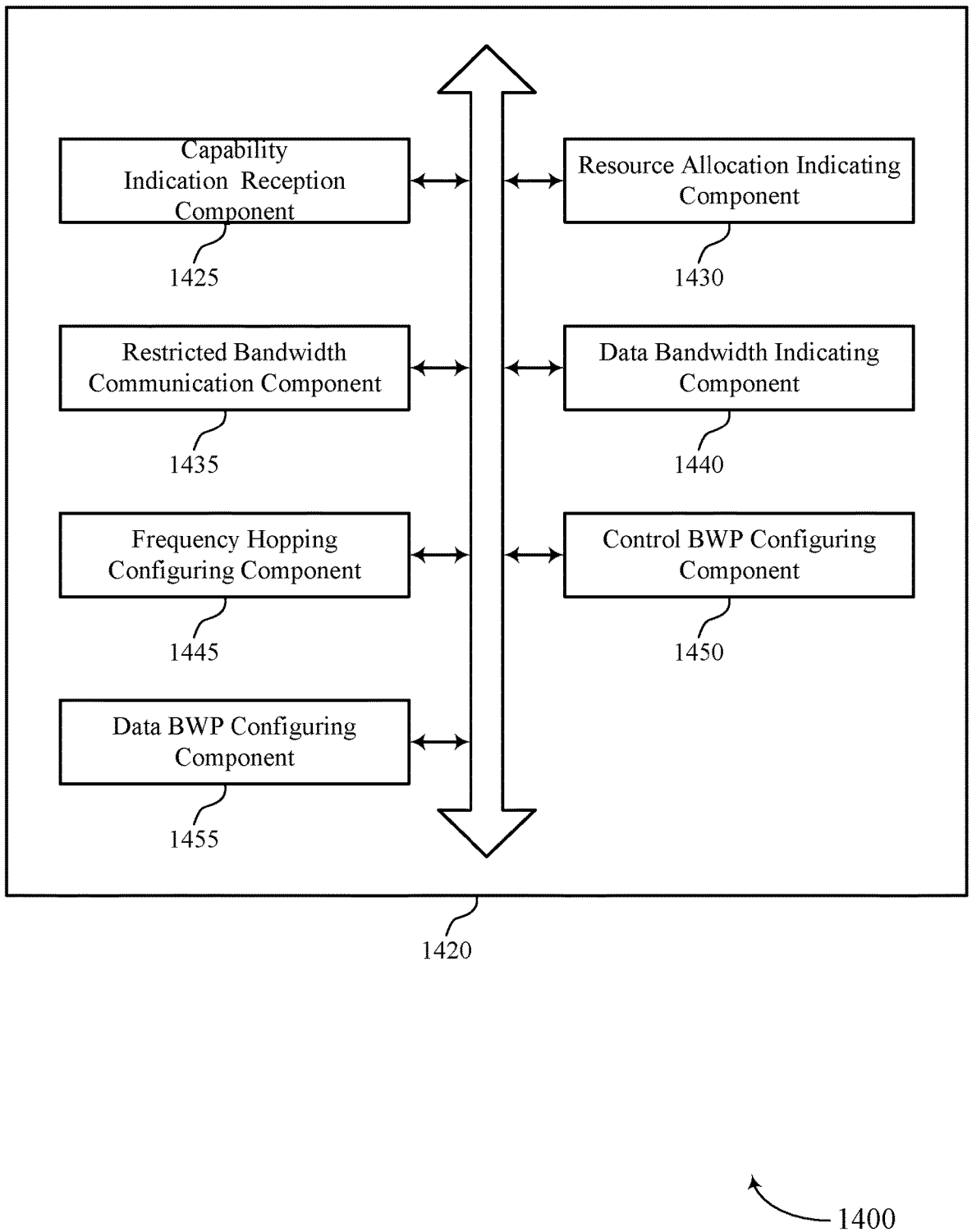
FIG. 14 shows a block diagram of a communications manager that supports frequency resource allocation for reduced capability devices in accordance with one or more aspects of the present disclosure.

FIG. 14 shows a block diagram 1400 of a communications manager 1420 that supports frequency resource allocation for reduced capability devices in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of frequency resource allocation for reduced capability devices as described herein. For example, the communications manager 1420 may include a capability indication reception component 1425, a resource allocation indicating component 1430, a restricted bandwidth communication component 1435, a data bandwidth indicating component 1440, a frequency hopping configuring component 1445, a control BWP configuring component 1450, a data BWP configuring component 1455, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications at a network entity in accordance with examples as disclosed herein. The capability indication reception component 1425 may be configured as or otherwise support a means for receiving an indication of a capability of a UE to support a restricted bandwidth for data signaling. The resource allocation indicating component 1430 may be configured as or otherwise support a means for transmitting an indication of a BWP for control signaling and an indication of a set of frequency domain resources for the data signaling, where the set of frequency domain resources corresponds to a subset of the BWP in accordance with the restricted bandwidth. The restricted bandwidth communication component 1435 may be configured as or otherwise support a means for communicating the control signaling over the BWP and data signaling over the set of frequency domain resources.

In some examples, to support transmitting the indication of the set of frequency domain resources, the data bandwidth indicating component 1440 may be configured as or otherwise support a means for transmitting an indication of a first physical resource block of a set of consecutive physical resource blocks in the set of frequency domain resources.

In some examples, to support transmitting the indication of the set of frequency domain resources, the data bandwidth indicating component 1440 may be configured as or otherwise support a means for transmitting an indication of a position from a set of candidate positions for the set of frequency domain resources within the BWP.

In some examples, to support transmitting the indication of the set of frequency domain resources, the data bandwidth indicating component 1440 may be configured as or otherwise support a means for transmitting an indication of a set of one or more resource block groups for the set of frequency domain resources.

In some examples, to support transmitting the indication of the set of frequency domain resources, the data bandwidth indicating component 1440 may be configured as or otherwise support a means for transmitting an indication of a first physical resource block of the set of frequency domain resources within the BWP and a quantity of physical resource blocks for the set of frequency domain resources.

In some examples, to support transmitting the indication of the set of frequency domain resources, the frequency hopping configuring component 1445 may be configured as or otherwise support a means for transmitting an indication of one or more frequency hopping configurations for the set of frequency domain resources.

In some examples, the frequency hopping configuring component 1445 may be configured as or otherwise support a means for transmitting an indication of a frequency hopping configuration from the one or more frequency hopping configurations, where communicating the data signaling is in accordance with the frequency hopping configuration based on the indication of the frequency hopping configuration.

In some examples, to support transmitting the indication of the BWP, the control BWP configuring component 1450 may be configured as or otherwise support a means for transmitting a first configuration for the BWP as a first BWP for the control signaling; and where transmitting the indication of the set of frequency domain resources includes. In some examples, to support transmitting the indication of the BWP, the data BWP configuring component 1455 may be configured as or otherwise support a means for transmitting a second configuration for the set of frequency domain resources as a second BWP for the data signaling in accordance with the restricted bandwidth.

In some examples, the second configuration includes a frequency domain resource assignment indicator which indicates the second BWP or a BWP index out of a set of multiple BWP indexes, or both.

In some examples, to support receiving the indication of the capability, the capability indication reception component 1425 may be configured as or otherwise support a means for receiving the indication of the capability via a random access preamble message or a radio resource control message, or both.

Figure 15:
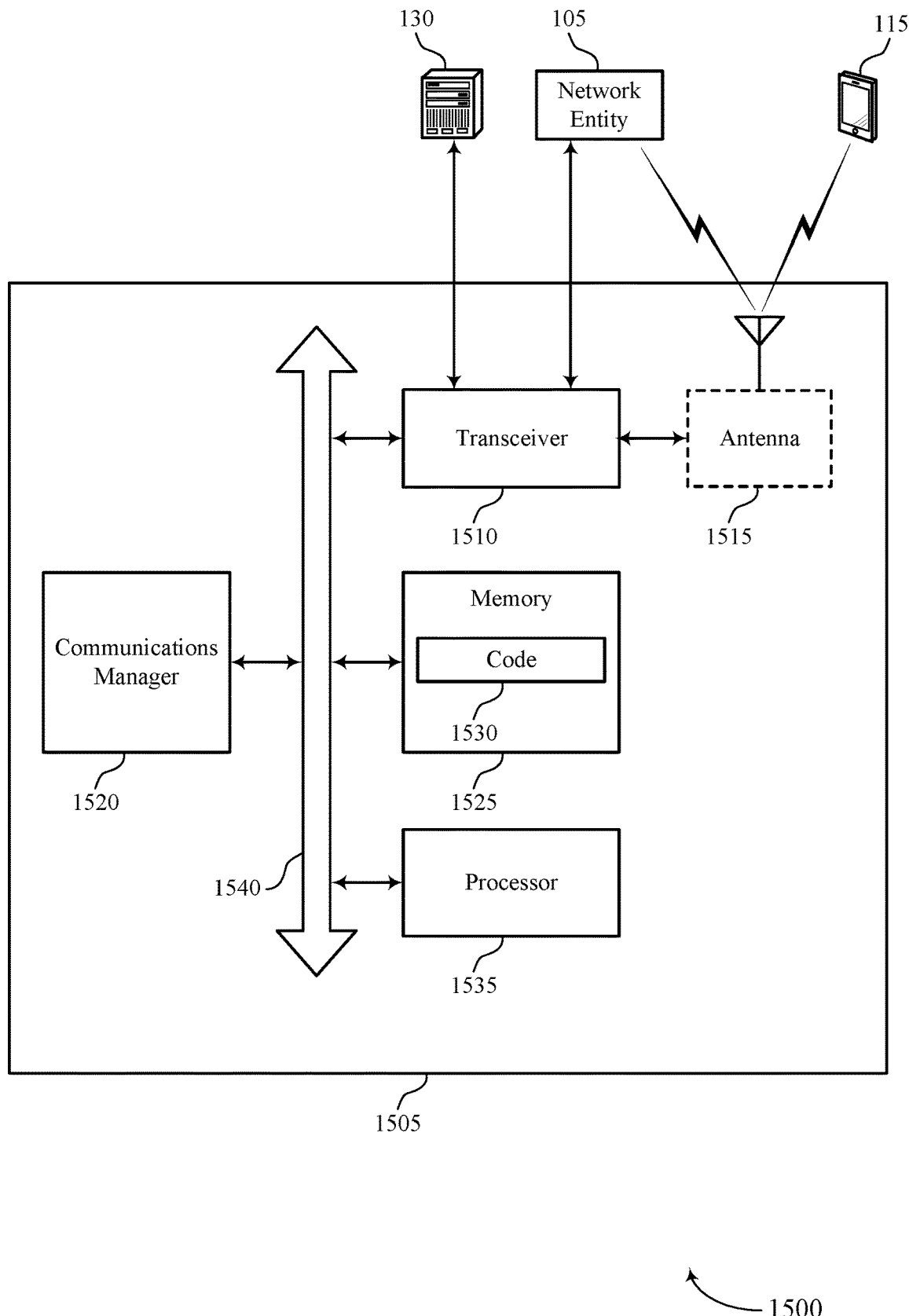
FIG. 15 shows a diagram of a system including a device that supports frequency resource allocation for reduced capability devices in accordance with one or more aspects of the present disclosure.

FIG. 15 shows a diagram of a system 1500 including a device 1505 that supports frequency resource allocation for reduced capability devices in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting frequency resource allocation for reduced capability devices). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications at a network entity in accordance with examples as disclosed herein. For example, the communications manager 1520 may be configured as or otherwise support a means for receiving an indication of a capability of a UE to support a restricted bandwidth for data signaling. The communications manager 1520 may be configured as or otherwise support a means for transmitting an indication of a BWP for control signaling and an indication of a set of frequency domain resources for the data signaling, where the set of frequency domain resources corresponds to a subset of the BWP in accordance with the restricted bandwidth. The communications manager 1520 may be configured as or otherwise support a means for communicating the control signaling over the BWP and data signaling over the set of frequency domain resources.

By including or configuring the communications manager 1520 in accordance with examples as described herein, the device 1505 may support techniques for reduced complexity for data signaling by using a data bandwidth that is allocated in accordance with a bandwidth restriction. The bandwidth restriction may decrease complexity for data signaling for lower capability devices, which may decrease processing power requirements.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of frequency resource allocation for reduced capability devices as described herein, or the processor 1535 and the memory 1525 may be otherwise configured to perform or support such operations.

Figure 16:
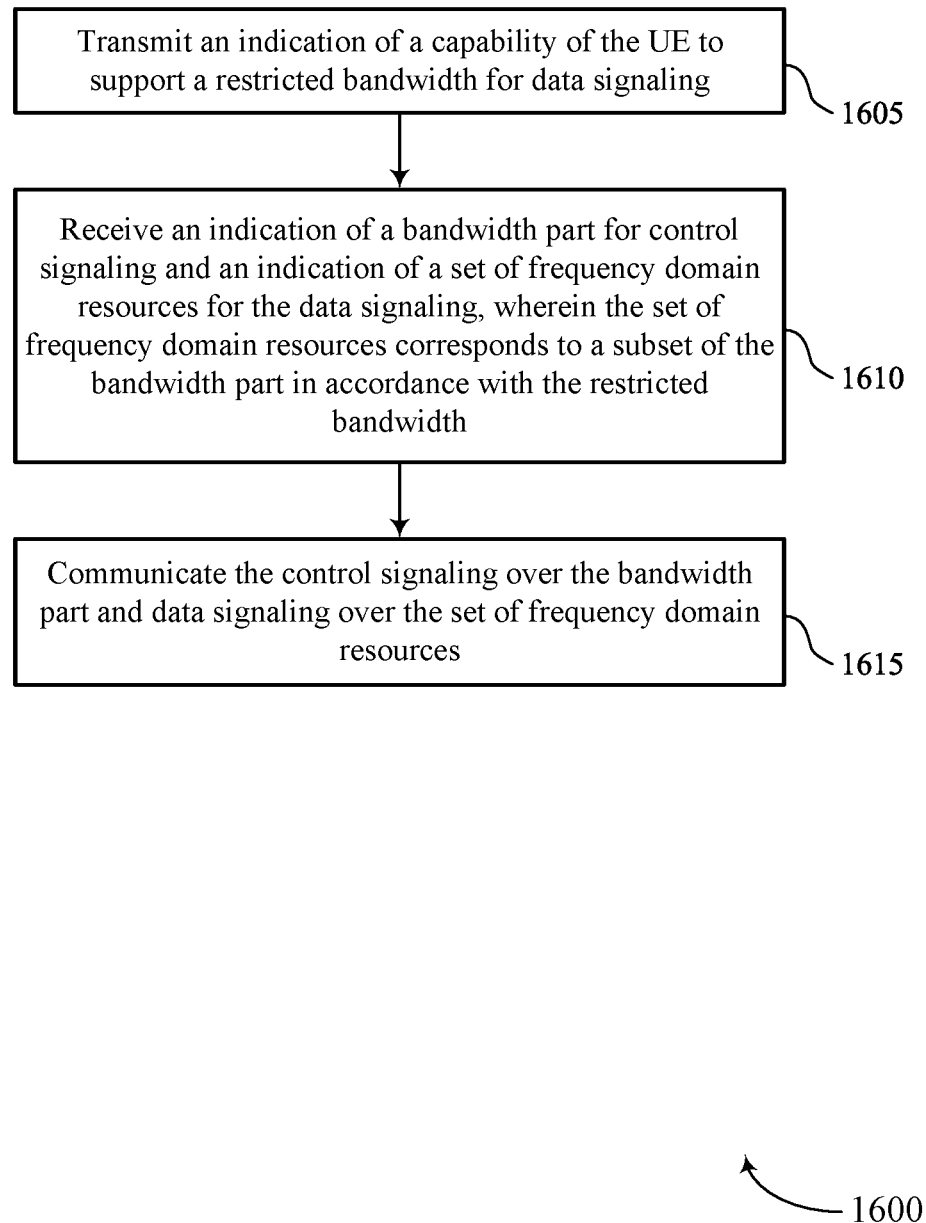
FIGS. 16 through 18 show flowcharts illustrating methods that support frequency resource allocation for reduced capability devices in accordance with one or more aspects of the present disclosure.

FIG. 16 shows a flowchart illustrating a method 1600 that supports frequency resource allocation for reduced capability devices in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include transmitting an indication of a capability of the UE to support a restricted bandwidth for data signaling. The operations of 1605 may be performed in accordance with examples as disclosed herein. In some examples, aspects of the operations of 1605 may be performed by a capability component 1025 as described with reference to FIG. 10.

At 1610, the method may include receiving an indication of a BWP for control signaling and an indication of a set of frequency domain resources for the data signaling, where the set of frequency domain resources corresponds to a subset of the BWP in accordance with the restricted bandwidth. The operations of 1610 may be performed in accordance with examples as disclosed herein. In some examples, aspects of the operations of 1610 may be performed by a resource allocation indication component 1030 as described with reference to FIG. 10.

At 1615, the method may include communicating the control signaling over the BWP and data signaling over the set of frequency domain resources. The operations of 1615 may be performed in accordance with examples as disclosed herein. In some examples, aspects of the operations of 1615 may be performed by a restricted bandwidth communication component 1035 as described with reference to FIG. 10.

Figure 17:
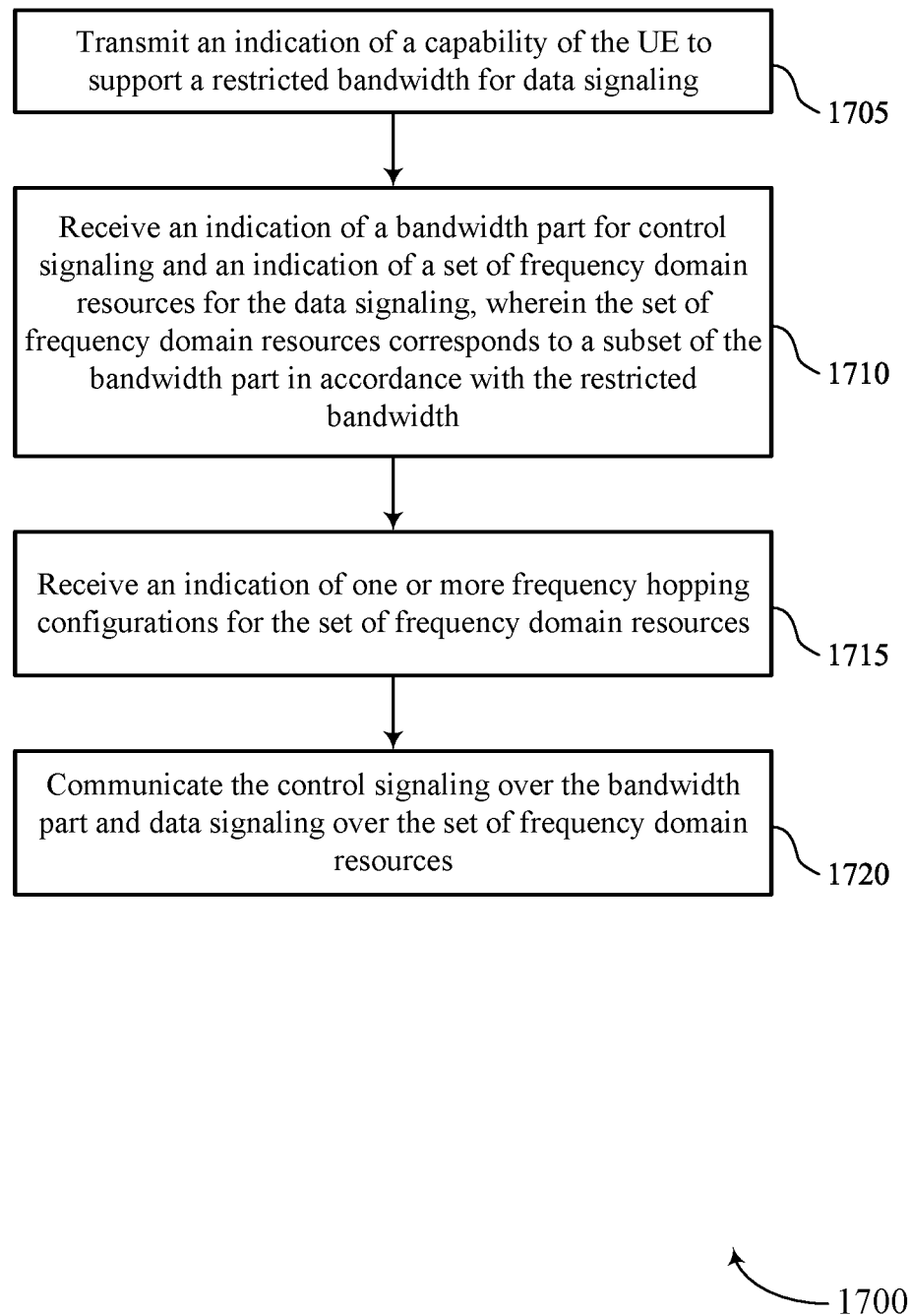

FIG. 17 shows a flowchart illustrating a method 1700 that supports frequency resource allocation for reduced capability devices in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include transmitting an indication of a capability of the UE to support a restricted bandwidth for data signaling. The operations of 1705 may be performed in accordance with examples as disclosed herein. In some examples, aspects of the operations of 1705 may be performed by a capability component 1025 as described with reference to FIG. 10.

At 1710, the method may include receiving an indication of a BWP for control signaling and an indication of a set of frequency domain resources for the data signaling, where the set of frequency domain resources corresponds to a subset of the BWP in accordance with the restricted bandwidth. The operations of 1710 may be performed in accordance with examples as disclosed herein. In some examples, aspects of the operations of 1710 may be performed by a resource allocation indication component 1030 as described with reference to FIG. 10.

At 1715, the method may include receiving an indication of one or more frequency hopping configurations for the set of frequency domain resources. The operations of 1715 may be performed in accordance with examples as disclosed herein. In some examples, aspects of the operations of 1715 may be performed by a frequency hopping configuration component 1045 as described with reference to FIG. 10.

At 1720, the method may include communicating the control signaling over the BWP and data signaling over the set of frequency domain resources. In some cases, the method may include communicating the data signaling over the set of frequency domain resources in accordance with a frequency hopping configuration from the one or more frequency hopping configurations. The operations of 1720 may be performed in accordance with examples as disclosed herein. In some examples, aspects of the operations of 1720 may be performed by a restricted bandwidth communication component 1035 as described with reference to FIG. 10.

Figure 18:
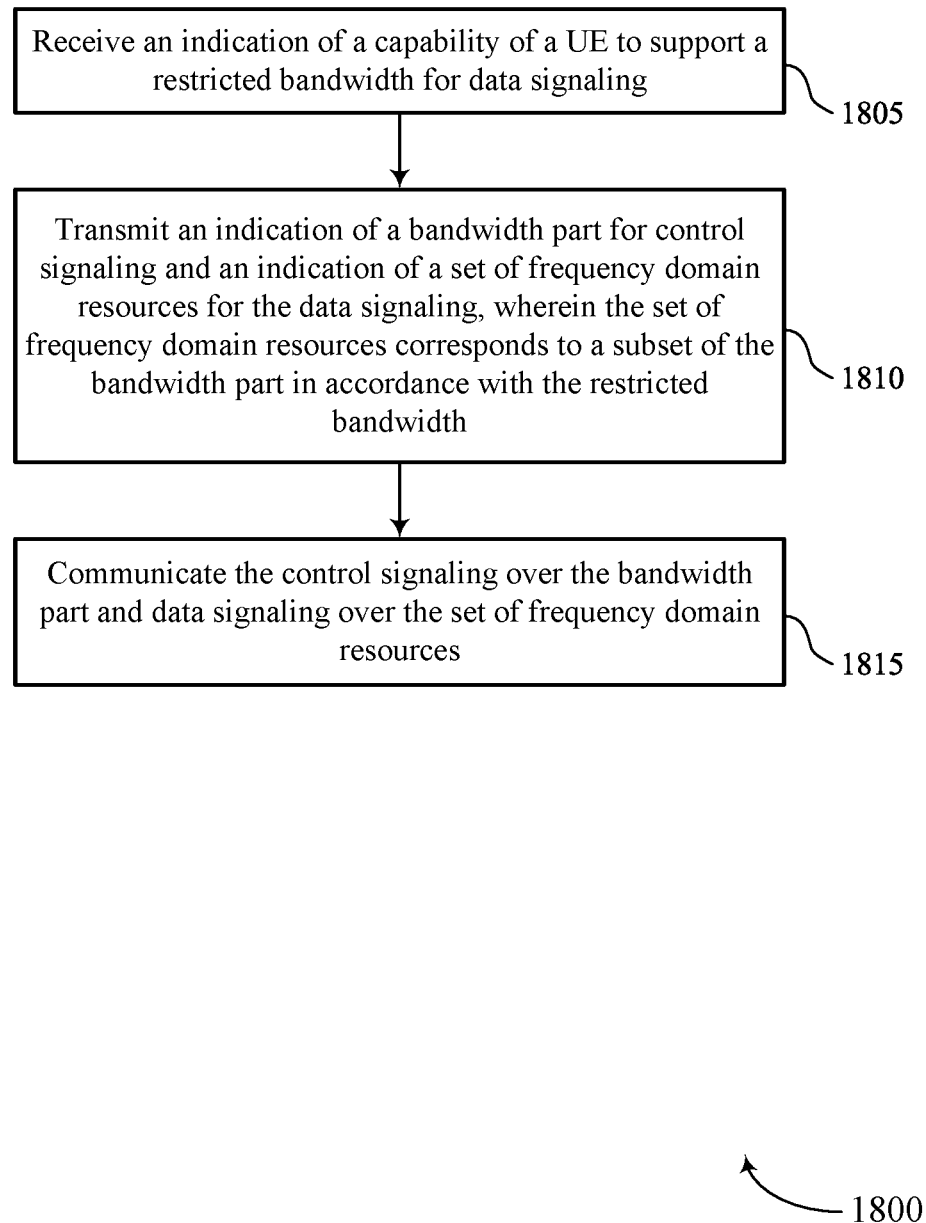

FIG. 18 shows a flowchart illustrating a method 1800 that supports frequency resource allocation for reduced capability devices in accordance with one or more aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include receiving an indication of a capability of a UE to support a restricted bandwidth for data signaling. The operations of 1805 may be performed in accordance with examples as disclosed herein. In some examples, aspects of the operations of 1805 may be performed by a capability indication reception component 1425 as described with reference to FIG. 14.

At 1810, the method may include transmitting an indication of a BWP for control signaling and an indication of a set of frequency domain resources for the data signaling, where the set of frequency domain resources corresponds to a subset of the BWP in accordance with the restricted bandwidth. The operations of 1810 may be performed in accordance with examples as disclosed herein. In some examples, aspects of the operations of 1810 may be performed by a resource allocation indicating component 1430 as described with reference to FIG. 14.

At 1815, the method may include communicating the control signaling over the BWP and data signaling over the set of frequency domain resources. The operations of 1815 may be performed in accordance with examples as disclosed herein. In some examples, aspects of the operations of 1815 may be performed by a restricted bandwidth communication component 1435 as described with reference to FIG. 14.

The following provides an overview of aspects of the present disclosure:

Aspect 1: A method for wireless communications at a UE, comprising: transmitting an indication of a capability of the UE to support a restricted bandwidth for data signaling; receiving an indication of a bandwidth part for control signaling and an indication of a set of frequency domain resources for the data signaling, wherein the set of frequency domain resources corresponds to a subset of the bandwidth part in accordance with the restricted bandwidth; and communicating the control signaling over the bandwidth part and data signaling over the set of frequency domain resources.

Aspect 2: The method of aspect 1, wherein receiving the indication of the set of frequency domain resources comprises: receiving an indication of a first physical resource block of a set of consecutive physical resource blocks in the set of frequency domain resources.

Aspect 3: The method of any of aspects 1 through 2, wherein receiving the indication of the set of frequency domain resources comprises: receiving an indication of a position from a set of candidate positions for the set of frequency domain resources within the bandwidth part.

Aspect 4: The method of any of aspects 1 through 3, wherein receiving the indication of the set of frequency domain resources comprises: receiving an indication of a set of one or more resource block groups for the set of frequency domain resources.

Aspect 5: The method of any of aspects 1 through 4, wherein receiving the indication of the set of frequency domain resources comprises: receiving an indication of a first physical resource block of the set of frequency domain resources within the bandwidth part and a quantity of physical resource blocks for the set of frequency domain resources.

Aspect 6: The method of any of aspects 1 through 5, wherein receiving the indication of the set of frequency domain resources comprises: receiving an indication of one or more frequency hopping configurations for the set of frequency domain resources.

Aspect 7: The method of aspect 6, wherein each frequency hopping configuration of the one or more frequency hopping configurations comprises a plurality of frequency offsets corresponding to a plurality of hops, and the plurality of frequency offsets are defined according to a reference point in the bandwidth part.

Aspect 8: The method of any of aspects 6 through 7, wherein the set of frequency domain resources spans an entirety of the bandwidth part or a portion of the bandwidth part over a plurality of hops in accordance with the one or more frequency hopping configurations.

Aspect 9: The method of any of aspects 6 through 8, wherein each frequency hopping configuration of the one or more frequency hopping configurations comprises a switching time between a first hop of the set of frequency domain resources and a second hop of the set of frequency domain resources.

Aspect 10: The method of any of aspects 6 through 9, further comprising: receiving an indication of a frequency hopping configuration from the one or more frequency hopping configurations, wherein communicating the data signaling is in accordance with the frequency hopping configuration based at least in part on the indication of the frequency hopping configuration.

Aspect 11: The method of any of aspects 1 through 10, wherein receiving the indication of the bandwidth part comprises: receiving a first configuration for the bandwidth part as a first bandwidth part for the control signaling; and wherein receiving the indication of the set of frequency domain resources comprises: receiving a second configuration for the set of frequency domain resources as a second bandwidth part for the data signaling in accordance with the restricted bandwidth.

Aspect 12: The method of aspect 11, wherein the second configuration includes a frequency domain resource assignment indicator which indicates the second bandwidth part.

Aspect 13: The method of any of aspects 11 through 12, wherein the second configuration indicates a bandwidth part index out of a plurality of bandwidth part indexes for the second bandwidth part.

Aspect 14: The method of any of aspects 1 through 13, wherein transmitting the indication of the capability comprises: transmitting the indication of the capability via a random access preamble message or a radio resource control message, or both.

Aspect 15: The method of aspect 14, further comprising: receiving one or more message of a random access procedure on the bandwidth part or the set of frequency domain resources, or both, based at least in part on transmitting the indication of the capability.

Aspect 16: The method of any of aspects 1 through 15, wherein communicating comprises monitoring for the control signaling on a downlink control channel on the bandwidth part and data signaling on a downlink shared channel on the set of frequency domain resources.

Aspect 17: The method of any of aspects 1 through 16, wherein communicating comprises transmitting the control signaling on an uplink control channel on the bandwidth part and data signaling on an uplink shared channel on the set of frequency domain resources.

Aspect 18: The method of any of aspects 1 through 17, wherein the restricted bandwidth for the data signaling corresponds to a maximum bandwidth for the set of frequency domain resources or a maximum number of physical resource blocks for the set of frequency domain resources, or both.

Aspect 19: A method for wireless communications at a network entity, comprising: receiving an indication of a capability of a UE to support a restricted bandwidth for data signaling; transmitting an indication of a bandwidth part for control signaling and an indication of a set of frequency domain resources for the data signaling, wherein the set of frequency domain resources corresponds to a subset of the bandwidth part in accordance with the restricted bandwidth; and communicating the control signaling over the bandwidth part and data signaling over the set of frequency domain resources.

Aspect 20: The method of aspect 19, wherein transmitting the indication of the set of frequency domain resources comprises: transmitting an indication of a first physical resource block of a set of consecutive physical resource blocks in the set of frequency domain resources.

Aspect 21: The method of any of aspects 19 through 20, wherein transmitting the indication of the set of frequency domain resources comprises: transmitting an indication of a position from a set of candidate positions for the set of frequency domain resources within the bandwidth part.

Aspect 22: The method of any of aspects 19 through 21, wherein transmitting the indication of the set of frequency domain resources comprises: transmitting an indication of a set of one or more resource block groups for the set of frequency domain resources.

Aspect 23: The method of any of aspects 19 through 22, wherein transmitting the indication of the set of frequency domain resources comprises: transmitting an indication of a first physical resource block of the set of frequency domain resources within the bandwidth part and a quantity of physical resource blocks for the set of frequency domain resources.

Aspect 24: The method of any of aspects 19 through 23, wherein transmitting the indication of the set of frequency domain resources comprises: transmitting an indication of one or more frequency hopping configurations for the set of frequency domain resources.

Aspect 25: The method of aspect 24, further comprising: transmitting an indication of a frequency hopping configuration from the one or more frequency hopping configurations, wherein communicating the data signaling is in accordance with the frequency hopping configuration based at least in part on the indication of the frequency hopping configuration.

Aspect 26: The method of any of aspects 19 through 25, wherein transmitting the indication of the bandwidth part comprises: transmitting a first configuration for the bandwidth part as a first bandwidth part for the control signaling; and wherein transmitting the indication of the set of frequency domain resources comprises: transmitting a second configuration for the set of frequency domain resources as a second bandwidth part for the data signaling in accordance with the restricted bandwidth.

Aspect 27: The method of aspect 26, wherein the second configuration includes a frequency domain resource assignment indicator which indicates the second bandwidth part or a bandwidth part index out of a plurality of bandwidth part indexes, or both.

Aspect 28: The method of any of aspects 19 through 27, wherein receiving the indication of the capability comprises: receiving the indication of the capability via a random access preamble message or a radio resource control message, or both.

Aspect 29: An apparatus for wireless communications at a UE, comprising a processor; memory coupled with the processor; and instructions stored in the memory and executable by the processor to cause the apparatus to perform a method of any of aspects 1 through 18.

Aspect 30: An apparatus for wireless communications at a UE, comprising at least one means for performing a method of any of aspects 1 through 18.

Aspect 31: A non-transitory computer-readable medium storing code for wireless communications at a UE, the code comprising instructions executable by a processor to perform a method of any of aspects 1 through 18.

Aspect 32: An apparatus for wireless communications at a network entity, comprising a processor; memory coupled with the processor; and instructions stored in the memory and executable by the processor to cause the apparatus to perform a method of any of aspects 19 through 28.

Aspect 33: An apparatus for wireless communications at a network entity, comprising at least one means for performing a method of any of aspects 19 through 28.

Aspect 34: A non-transitory computer-readable medium storing code for wireless communications at a network entity, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
      transmit an indication of a capability of the UE to support a restricted bandwidth for data signaling;

receive an indication of a bandwidth part for control signaling and an indication of a set of frequency domain resources for the data signaling, wherein the set of frequency domain resources corresponds to a subset of the bandwidth part in accordance with the restricted bandwidth; and communicate the control signaling over the bandwidth part and data signaling over the set of frequency domain resources.

2. The apparatus of claim 1, wherein the instructions to receive the indication of the set of frequency domain resources are executable by the processor to cause the apparatus to:

receive an indication of a first physical resource block of a set of consecutive physical resource blocks in the set of frequency domain resources.

3. The apparatus of claim 1, wherein the instructions to receive the indication of the set of frequency domain resources are executable by the processor to cause the apparatus to:

receive an indication of a position from a set of candidate positions for the set of frequency domain resources within the bandwidth part.

4. The apparatus of claim 1, wherein the instructions to receive the indication of the set of frequency domain resources are executable by the processor to cause the apparatus to:

receive an indication of a set of one or more resource block groups for the set of frequency domain resources.

5. The apparatus of claim 1, wherein the instructions to receive the indication of the set of frequency domain resources are executable by the processor to cause the apparatus to:

receive an indication of a first physical resource block of the set of frequency domain resources within the bandwidth part and a quantity of physical resource blocks for the set of frequency domain resources.

6. The apparatus of claim 1, wherein the instructions to receive the indication of the set of frequency domain resources are executable by the processor to cause the apparatus to:

receive an indication of one or more frequency hopping configurations for the set of frequency domain resources.

7. The apparatus of claim 6, wherein each frequency hopping configuration of the one or more frequency hopping configurations comprises a plurality of frequency offsets corresponding to a plurality of hops, and the plurality of frequency offsets are defined according to a reference point in the bandwidth part.

8. The apparatus of claim 6, wherein the set of frequency domain resources spans an entirety of the bandwidth part or a portion of the bandwidth part over a plurality of hops in accordance with the one or more frequency hopping configurations.

9. The apparatus of claim 6, wherein each frequency hopping configuration of the one or more frequency hopping configurations comprises a switching time between a first hop of the set of frequency domain resources and a second hop of the set of frequency domain resources.

10. The apparatus of claim 6, wherein the instructions are further executable by the processor to cause the apparatus to:

receive an indication of a frequency hopping configuration from the one or more frequency hopping configurations, wherein communicating the data signaling is in accordance with the frequency hopping configuration based at least in part on the indication of the frequency hopping configuration.

11. The apparatus of claim 1, wherein the instructions to receive the indication of the bandwidth part are executable by the processor to cause the apparatus to:

receive a first configuration for the bandwidth part as a first bandwidth part for the control signaling; and wherein the instructions to receive the indication of the set of frequency domain resources are executable by the processor to cause the apparatus to:

receive a second configuration for the set of frequency domain resources as a second bandwidth part for the data signaling in accordance with the restricted bandwidth.

12. The apparatus of claim 11, wherein the second configuration includes a frequency domain resource assignment indicator which indicates the second bandwidth part.

13. The apparatus of claim 11, wherein the second configuration indicates a bandwidth part index out of a plurality of bandwidth part indexes for the second bandwidth part.

14. The apparatus of claim 1, wherein the instructions to transmit the indication of the capability are executable by the processor to cause the apparatus to:

transmit the indication of the capability via a random access preamble message or a radio resource control message, or both.

15. The apparatus of claim 14, wherein the instructions are further executable by the processor to cause the apparatus to:

receive one or more message of a random access procedure on the bandwidth part or the set of frequency domain resources, or both, based at least in part on transmitting the indication of the capability.

16. The apparatus of claim 1, wherein communicating comprises monitoring for the control signaling on a downlink control channel on the bandwidth part and data signaling on a downlink shared channel on the set of frequency domain resources.

17. The apparatus of claim 1, wherein communicating comprises transmitting the control signaling on an uplink control channel on the bandwidth part and data signaling on an uplink shared channel on the set of frequency domain resources.

18. The apparatus of claim 1, wherein the restricted bandwidth for the data signaling corresponds to a maximum bandwidth for the set of frequency domain resources or a maximum number of physical resource blocks for the set of frequency domain resources, or both.

19. An apparatus for wireless communications at a network entity, comprising:

a processor;

memory coupled with the processor; and instructions stored in the memory and executable by the processor to cause the apparatus to:

receive an indication of a capability of a user equipment (UE) to support a restricted bandwidth for data signaling;

transmit an indication of a bandwidth part for control signaling and an indication of a set of frequency domain resources for the data signaling, wherein the set of frequency domain resources corresponds to a subset of the bandwidth part in accordance with the restricted bandwidth; and communicate the control signaling over the bandwidth part and data signaling over the set of frequency domain resources.

20. The apparatus of claim 19, wherein the instructions to transmit the indication of the set of frequency domain resources are executable by the processor to cause the apparatus to:
  transmit an indication of a first physical resource block of a set of consecutive physical resource blocks in the set of frequency domain resources.

21. The apparatus of claim 19, wherein the instructions to transmit the indication of the set of frequency domain resources are executable by the processor to cause the apparatus to:
  transmit an indication of a position from a set of candidate positions for the set of frequency domain resources within the bandwidth part.

22. The apparatus of claim 19, wherein the instructions to transmit the indication of the set of frequency domain resources are executable by the processor to cause the apparatus to:
  transmit an indication of a set of one or more resource block groups for the set of frequency domain resources.

23. The apparatus of claim 19, wherein the instructions to transmit the indication of the set of frequency domain resources are executable by the processor to cause the apparatus to:
  transmit an indication of a first physical resource block of the set of frequency domain resources within the bandwidth part and a quantity of physical resource blocks for the set of frequency domain resources.

24. The apparatus of claim 19, wherein the instructions to transmit the indication of the set of frequency domain resources are executable by the processor to cause the apparatus to:
  transmit an indication of one or more frequency hopping configurations for the set of frequency domain resources.

25. The apparatus of claim 24, wherein the instructions are further executable by the processor to cause the apparatus to:
  transmit an indication of a frequency hopping configuration from the one or more frequency hopping configurations, wherein communicating the data signaling is in accordance with the frequency hopping configuration based at least in part on the indication of the frequency hopping configuration.

26. The apparatus of claim 19, wherein the instructions to transmit the indication of the bandwidth part are executable by the processor to cause the apparatus to:
  transmit a first configuration for the bandwidth part as a first bandwidth part for the control signaling; and
wherein the instructions to transmit the indication of the set of frequency domain resources are executable by the processor to cause the apparatus to:
  transmit a second configuration for the set of frequency domain resources as a second bandwidth part for the data signaling in accordance with the restricted bandwidth.

27. The apparatus of claim 26, wherein the second configuration includes a frequency domain resource assignment indicator which indicates the second bandwidth part or a bandwidth part index out of a plurality of bandwidth part indexes, or both.

28. The apparatus of claim 19, wherein the instructions to receive the indication of the capability are executable by the processor to cause the apparatus to:
  receive the indication of the capability via a random access preamble message or a radio resource control message, or both.

29. A method for wireless communications at a user equipment (UE), comprising:
  transmitting an indication of a capability of the UE to support a restricted bandwidth for data signaling;
  receiving an indication of a bandwidth part for control signaling and an indication of a set of frequency domain resources for the data signaling, wherein the set of frequency domain resources corresponds to a subset of the bandwidth part in accordance with the restricted bandwidth; and
  communicating the control signaling over the bandwidth part and data signaling over the set of frequency domain resources.

30. A method for wireless communications at a network entity, comprising:
  receiving an indication of a capability of a user equipment (UE) to support a restricted bandwidth for data signaling;
  transmitting an indication of a bandwidth part for control signaling and an indication of a set of frequency domain resources for the data signaling, wherein the set of frequency domain resources corresponds to a subset of the bandwidth part in accordance with the restricted bandwidth; and
  communicating the control signaling over the bandwidth part and data signaling over the set of frequency domain resources.

* * * * *